US012481863B2

(12) United States Patent
Byrne et al.

(10) Patent No.: US 12,481,863 B2
(45) Date of Patent: Nov. 25, 2025

(54) AUTOMATED GENERATION OF NEURAL NETWORKS

(71) Applicant: Movidius Ltd., Schiphol-Rijk (NL)

(72) Inventors: Jonathan David Byrne, Ashbourne (IE); David Macdara Moloney, Dublin (IE); Xiaofan Xu, Dublin (IE); Tomaso F L Cetto, Veyrier (CH)

(73) Assignee: Intel Corporation, Santa Clara, CA (US)

( * ) Notice: Subject to any disclaimer, the term of this patent is extended or adjusted under 35 U.S.C. 154(b) by 996 days.

(21) Appl. No.: 17/290,428

(22) PCT Filed: Oct. 31, 2019

(86) PCT No.: PCT/US2019/059220
§ 371 (c)(1),
(2) Date: Apr. 30, 2021

(87) PCT Pub. No.: WO2020/092810
PCT Pub. Date: May 7, 2020

(65) Prior Publication Data
US 2021/0390376 A1 Dec. 16, 2021

Related U.S. Application Data

(60) Provisional application No. 62/753,822, filed on Oct. 31, 2018.

(51) Int. Cl.
*G06N 3/045* (2023.01)
(52) U.S. Cl.
CPC .................................. *G06N 3/045* (2023.01)

(58) Field of Classification Search
CPC ........ G06N 3/045; G06N 3/082; G06N 3/084; G06N 3/086
See application file for complete search history.

(56) References Cited

U.S. PATENT DOCUMENTS 5,704,012 A   12/1997  Bigus
8,131,656 B2   3/2012  Goldberg et al.
(Continued)

FOREIGN PATENT DOCUMENTS

CN   105279555 A   1/2016
CN   106056209 A   10/2016
CN   107346326 A   11/2017

OTHER PUBLICATIONS

Assuncao et al., "DENSER: Deep Evolutionary Network Structured Representation" (Year: 2018).*
(Continued)

*Primary Examiner* — Ryan C Vaughn
(74) *Attorney, Agent, or Firm* — Akona IP PC

(57) ABSTRACT

A grammar is used in a grammatical evolution of a set of parent neural network models to generate a set of child neural network models. A generation of neural network models is tested based on a set of test data, where the generation includes the set of child neural network models. Respective values for each one of a plurality of attributes are determined for each neural network in the generation, where one of the attributes includes a validation accuracy value determined from the test. Multi-objective optimization is performed based on the values of the plurality of attributes for the generation of neural networks and a subset of the generation of neural network models is selected based on the results of the multi-objective optimization.

20 Claims, 16 Drawing Sheets

(56) References Cited

U.S. PATENT DOCUMENTS

| | | | |
|---|---|---|---|
| 8,301,390 | B2 | 10/2012 | Sastry et al. |
| 8,548,231 | B2 | 10/2013 | Shet et al. |
| 2016/0035344 | A1* | 2/2016 | Gonzalez-Dominguez ................ G06N 3/044 704/254 |
| 2017/0206465 | A1* | 7/2017 | Jin ...................... G06F 16/5866 |

OTHER PUBLICATIONS

Deb et al., "A Fast and Elitist Multiobjective Genetic Algorithm: NSGA-11" (Year: 2002).*

Tsoulos et al., "Neural Network Construction and Training Using Grammatical Evolution," in 72 Neurocomputing 269-77 (2008). (Year: 2008).*

Ahmadizar, Fardin et al., "Artificial Neural Network Development by Means of a Novel Combination of Grammatical Evolution and Genetic Algorithm," Engineering Applications of Artificial Intelligence, vol. 39, (Dec. 6, 2014) (13 pages).

EPO Extended Search Report and Written Opinion in EP Application Serial No. 19878027.2 mailed on Jul. 4, 2022 (14 pages).

Soltanian, Khabat et al., "Artificial Neural Networks Generation Using Grammatical Evolution," 2013 21st Iranian Conference on Electrical Engineering (ICEE) (May 14, 2013) (5 pages).

Tsoulos, Ioannis et al., "Neural Network Construction and Training Using Grammatical Evolution," Science Direct, Neurocomputing, Elsevier, vol. 72, 269-277 (Mar. 10, 2008) (9 pages).

Deb, Kalyanmoy, "A Fast and Elitist Multiobjective Genetic Algorithm NSGA-II," IEEE Transactions on Evolutionary Computation, vol. 6, No. 2, Apr. 2002 (16 pages).

PCT International Preliminary Report on Patentability issued in PCT/US2019/059220, dated May 14, 2021; 12 pages.

PCT International Search Report and Written Opinion in PCT International Application Serial No. PCT/US2019/059220 mailed on Feb. 27, 2020 (13 pages).

* cited by examiner

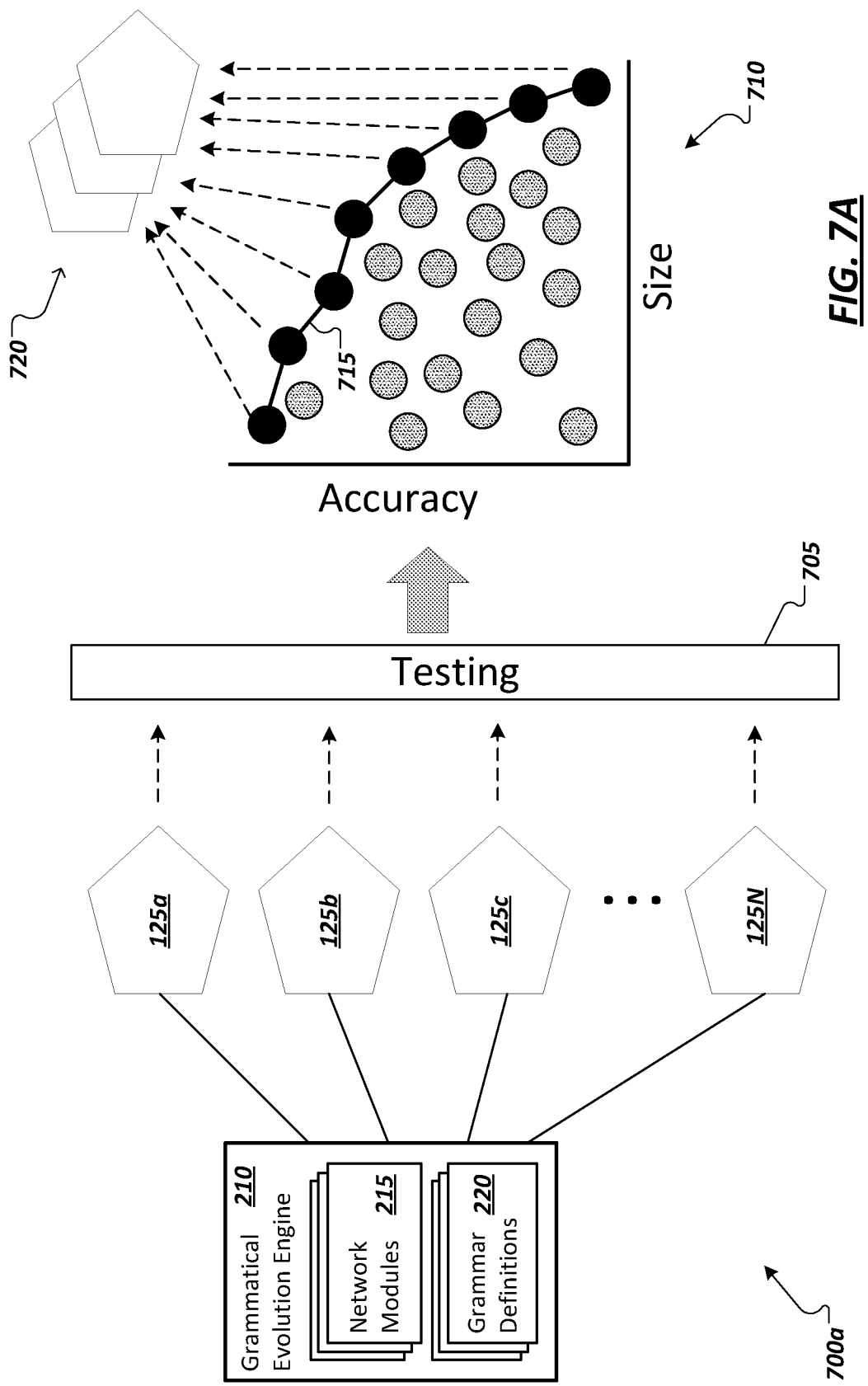

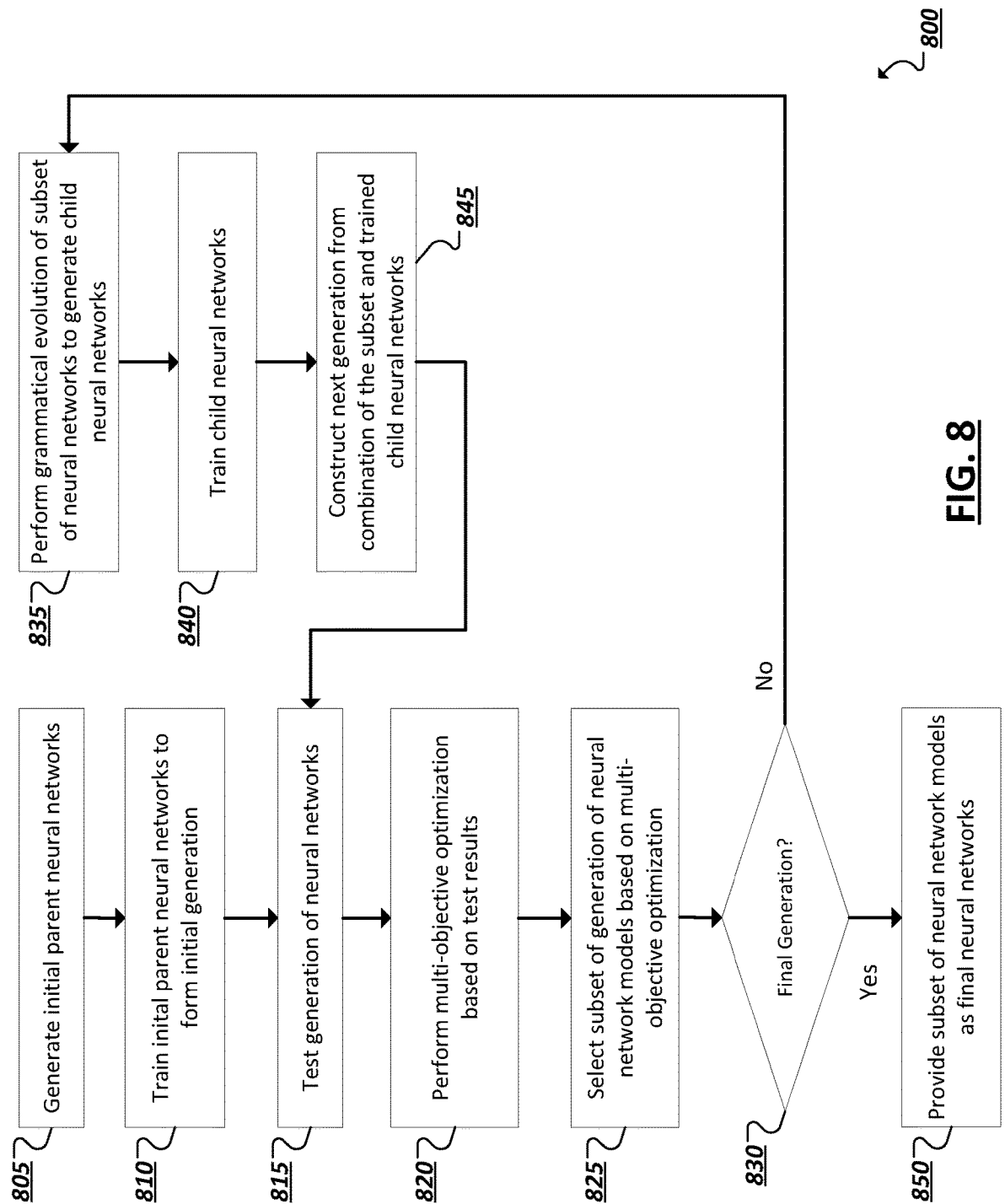

AUTOMATED GENERATION OF NEURAL NETWORKS

RELATED APPLICATIONS

This Application is a national stage application under 35 U.S.C. § 371 of PCT International Application Serial No. PCT/US2019/059220, filed on Oct. 31, 2019, which application claims benefit to U.S. Provisional Patent Application Ser. No. 62/753,822, filed Oct. 31, 2018. The disclosures of the prior applications are considered part of and are hereby incorporated by reference in their entirety in the disclosure of this application.

TECHNICAL FIELD

This disclosure relates in general to the field of computer systems and, more particularly, to the automated generation of neural network models.

BACKGROUND

An artificial neural network is a type of computational model that can be used to solve tasks that are difficult to solve using traditional computational models. For example, an artificial neural network can be trained to perform pattern recognition tasks that would be extremely difficult to implement using other traditional programming paradigms. Utilizing an artificial neural network often requires performing calculations and operations to develop, train, and update the artificial neural network. Neural networks may be utilized along with other models to implement machine learning functionality in computing systems. Machine learning may be utilized in connection with applications, such as computer vision, e-commerce, gaming, robotic locomotion, big data analytics, image recognition, and language processing, among other examples.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements. The accompanying figures are schematic and are not intended to be drawn to scale. For purposes of clarity, not every component is labelled in every figure. Nor is every component of each embodiment of the disclosed subject matter shown where illustration is not necessary to allow those of ordinary skill in the art to understand the disclosed subject matter.

FIGS. 7A-7B are simplified block diagrams illustrating example generation of neural network models utilizing grammatical evolution;

FIG. 8 is a simplified block diagram illustrating an example technique involved in automatic generation of neural network models;

DETAILED DESCRIPTION OF EXAMPLE EMBODIMENTS

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments provided below are exemplary, and that it is contemplated that there are other systems and methods that are within the scope of the disclosed subject matter.

A variety of technologies are emerging based on and incorporating augmented reality, virtual reality, mixed reality, autonomous devices, and robots, which may make use of machine learning employing various machine learning models, including neural networks and deep learning models. In many of these applications, it is anticipated that the devices (and corresponding compute logic) that will make use of such models may include small drones and robots, wearable devices, and virtual reality systems, among other examples. As systems grow smaller, the memory and processing resources of such devices may also be constrained. As an example, AR/VR/MR applications may demand high-frame rates for the graphical presentations generated using supporting hardware or to realize suitably fast response times to sensed conditions (e.g., actuating a movement by a robot, drone, or autonomous vehicle), among other examples. Some applications may be challenged to satisfactorily execute large, resource intensive machine learning models, such as current, high-accuracy convolutional neural network (CNN) models, while simultaneously meeting constraints in processing, memory, power, application requirements of the corresponding system, among other example issues.

Figure 1:
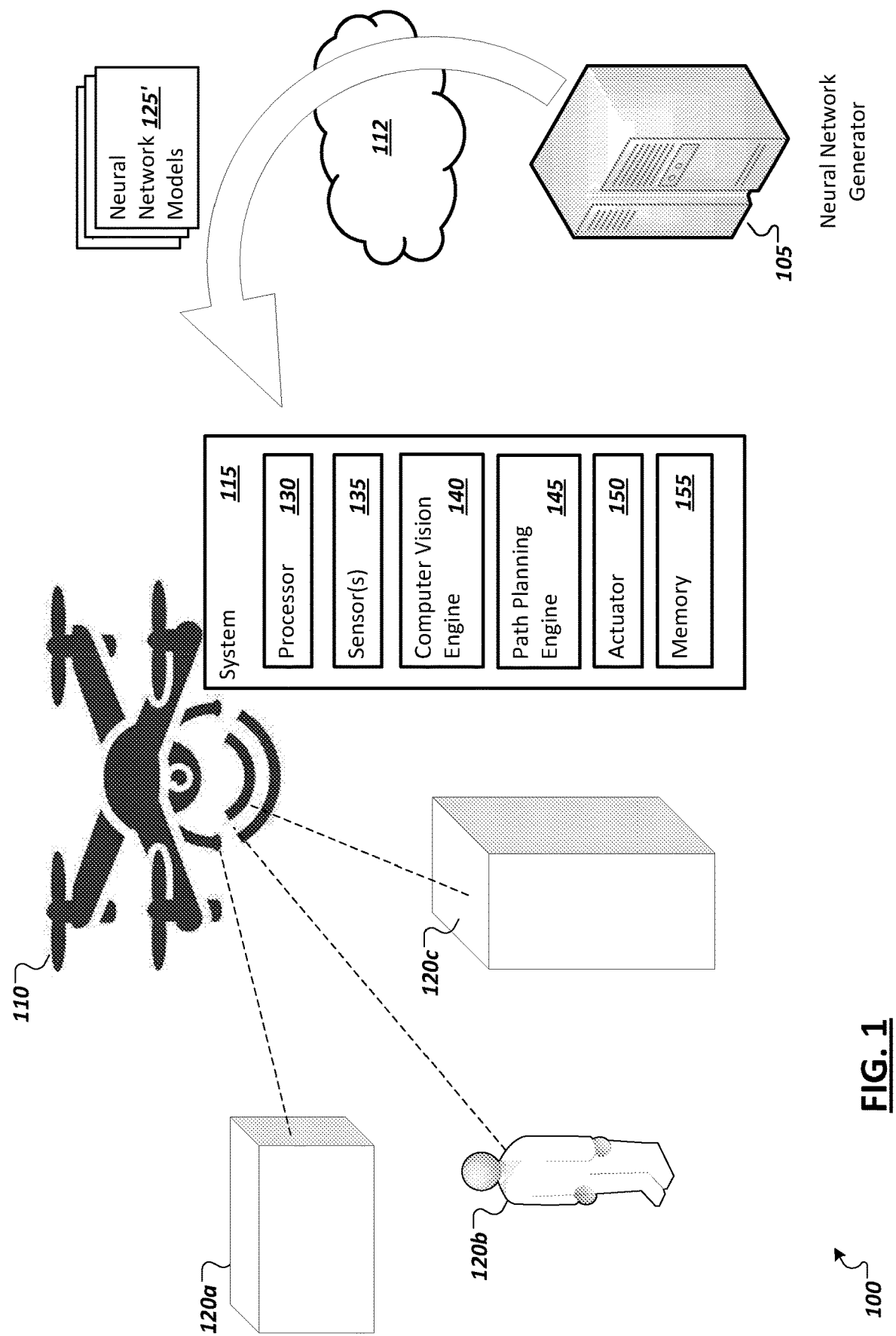
FIG. 1 illustrates an example system employing machine learning in accordance with some embodiments.

Turning to FIG. 1, a simplified block diagram 100 is shown illustrating an example environment involving a machine 110 (e.g., a drone or robot) that is to use machine learning and machine learning models in connection with its operation (e.g., analyzing a 3D space, recognizing destinations and hazards, path planning, etc.). For instance, in one example, the machine 110 may be implemented as an autonomous or semi-autonomous machine capable of processing sensor data (e.g., from one or more local (e.g., 135) or external sensors describing an environment around the machine 110) and utilizing this information to autonomously move within the scene (e.g., change its position within the scene and/or change the orientation (e.g., aim) of one or more of the machine's elements (e.g., a sensor, camera, pointer, actuator, tool, etc.) based on hazards and/or destinations recognized by the machine within the scene. For instance, the machine may detect and recognize various objects (e.g., 120a-c) within the scene utilizing a computer vision engine 140. Implementing the computer vision engine 140 may include the implementation and execution of one or more machine learning model (using one or more computer processors (e.g., 130) at the machine, including specialized processors and hardware accelerators specialized for performing deep learning operations). The machine may utilize the results of the computer vision engine 140 to determine a path within the environment (e.g., using path planning engine 145) and navigate or interact with the scene autonomously based on the detected objects. In some implementations, the machine 115 may be embodied as an autonomous vehicle (for carrying passenger or cargo), an aerial, ground-based, or water-based drone, and a robot, among other examples.

As introduced above, in some examples, the machine 110 may include a computing system implemented using one or more data processors 130, such as one or more central processing units (CPUs), graphical processing units (GPUs), tensor processing units or other matrix arithmetic processors, hardware accelerators (e.g., volumetric processing accelerator, machine learning accelerator), among other example general purpose and specialized processing hardware, and further implemented using one or more memory elements (e.g., 155). Additional logical blocks may be provided, which are implemented in hardware circuitry, firmware, or software, such as computer vision engine 140, path planning engine 145, and one or more actuators 150 (to control responsive actions by the machine 110), among other example logic and functionality specific to the machine's implementation and purpose. In some implementations, the machine 110 may additionally include one or more sensors (e.g., 135) to measure aspects of the environment around the machine (e.g., global positioning sensor, light detecting and ranging (LIDAR) sensors, image sensors, ultrasonic sensors, audio sensors, time of flight sensors, realsense sensors, etc.). Data derived from such sensors 135 may be provided as inputs to one or more machine learning models, such as deep learning networks and other artificial neural network models.

As shown in the example of FIG. 1, in some implementations, neural network models (e.g., 125') utilized by an example machine 110 (and related machine learning compute system(s)) may be developed and provided by an example neural network generator system (e.g., 105). In some implementations, such neural networks may be selected or otherwise provided (e.g., over one or more networks 112) from a collection of neural networks designed, trained, and validated automatically (e.g., not manually by a human engineer) by the neural network generator system 105. For instance, evolutionary computing techniques and genetic algorithms may be applied by the neural network generator system 105 to generate particular neural networks (e.g., 125'), which may be of use to the machine 110, not only as providing suitable accuracy at the application level, but also tuned to the compute and memory resources available at the machine 110 (which in some cases may be constrained, for instance, due to the size, battery power, or other limitations of the device), among other examples.

In recent years, automated generation of convolutional neural networks (CNNs) (e.g., through AutoML) in favor of traditional hand-crafted design approaches has garnered increased attention. However, traditional automated neural network design approaches have been concentrated on automatically generating high performance, state of the art (SOTA) architectures, with the primary aim of setting new standards of accuracy. Such approaches may amount to a single-factor-optimization, with the sole focus being on evolving neural network designs to maximize the achievable accuracy of the model. However, SOTA neural networks are not a one-size-fits-all solution within the myriad of existing and developing machine learning applications and the computing systems being utilized to implement such solutions. For instance, some applications may call for simple, effective, and mobile-sized architectures which can easily be re-trained on any dataset, without the need for large amounts of compute power (e.g., hundreds of graphics processing units (GPUs)).

Since their introduction, Convolutional Neural Networks (CNNs) have steadily increased in popularity for machine vision applications, and in the last few years have set benchmarks in image classification and detection tasks. Throughout the years, the approach to designing these networks has remained essentially unchanged: manual setting of the parameters and hyperparameters through extensive trial-and-error methods. The increase in depth/complexity of CNNs has been accompanied by a growing difficulty in identifying the interactions between architecture choices and their effect on the accuracy of the models. In recent years, there has been growing interest in methods which seek to automatically search for optimal network architectures (e.g., AutoML). Approaches have been varied and include reinforcement learning, NeuroEvolution (NE), sequentially structured search, and Bayesian optimization. Some traditional automated neural network generation techniques utilize evolutionary algorithms in connection with their optimization to finding state-of-the-art (SOTA) architectures, and use validation accuracy on the test set as the fitness function of the algorithm. Automatic optimization of neural network performance through evolutionary approaches has rapidly come to rival event state-of-the-art manually crafted networks. These evolutionary methods are usually grouped with respect to the part of the network they seek to optimize: learning, topology, or both. However, such traditional approaches can be very computationally expensive, in some cases involving thousands of GPU days worth of computation to evolve to the desired "optimal" network structure.

In an improved system, a multi-objective optimization may be performed utilizing grammatical evolution to generate and evolve automatically generated neural network models to optimize performance with respect to both accuracy and size. Convolutional neural network models generated using such a system may enable a search for smaller, mobile-sized networks, which can be easily re-trained, if need be, without the need for very substantial GPU power. Grammatical evolution (GE) is a grammar-based form of genetic programming (GP), where a formal grammar is used to map from phenotype to genotype. Additionally, the grammar allows domain specific knowledge to be incorporated in and used by the system in generating candidate neural network models. In some implementations, the grammar may be implemented using a Backus-Naur Form (BNF) grammar. Such an approach may enable flexible use of the system to assess and develop a variety of different neural networks that are based on a variety of different components (e.g., subnetworks, layers, filters, etc.) according to the desired application. Further, as the knowledge base for neural network architectures inevitably increases, the grammar may be augmented or otherwise modified to incorporate this knowledge to build new types of candidate models (e.g., with different validity requirements, from different combinations of components/modules, etc.), among other examples.

In one example, the grammatical evolution technique utilized by an example neural network generator system may utilize derivations of a Context Free Grammar (CFG) with the grammar and evolution based on parameters associated with specific layers, as well as the allowed number of times these layers can be used, among other factors, such as parameters associated with the optimization process (e.g., batch size, learning rate, etc.). In some implementations, the evolved generations of candidate neural network models may be assessed and further evolve by generating "children" neural network models only from those "parent" neural network models, which perform "best" according to according to a multi-objective optimization. For instance, a non-dominated front (or Pareto front) may be determined for the generation of neural network models and those neural networks representing or "on" the front may be selected as serving as parents of the next generation of the neural network models, and so on until a suitable number of generations are generated, among other example implementations.

Figure 2:
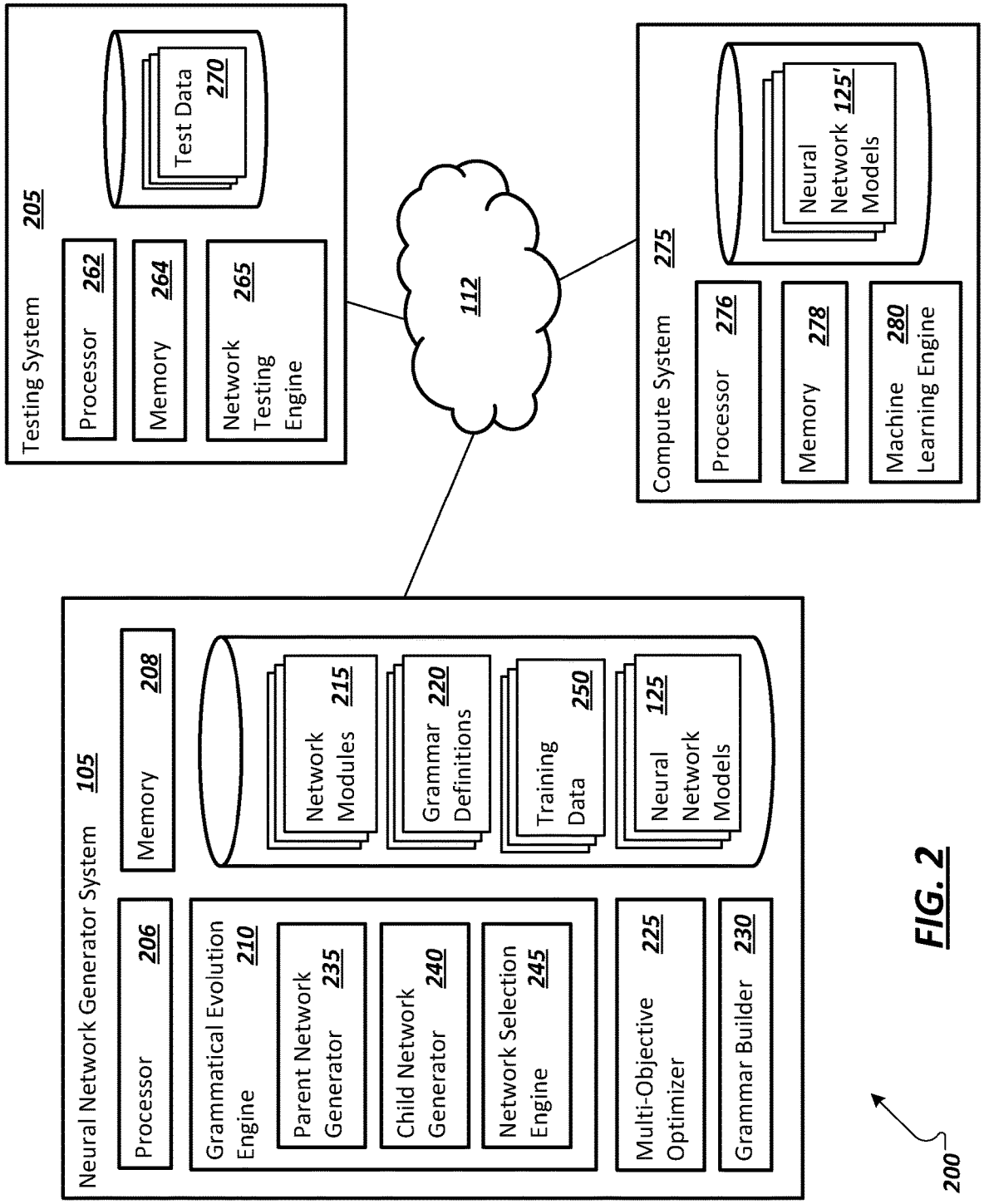
FIG. 2 is a simplified block diagram illustrating a computing environment including an example neural network generator system.

Turning to FIG. 2, a simplified block diagram 200 is shown illustrating an example computing environment including an example neural network generator system 105 equipped with functionality to utilize grammatical evolution to automatically generate neural network models based on multi-objective optimization. The neural network generator system 105 may implement genetic algorithms and other automated techniques to autonomously generate sets of neural network models 125, which may be utilized by various compute systems (e.g., 275). In some implementations, a testing system (e.g., 205) may be provided to automatically test and validate the neural network models generated by the neural network generator system 105. The results generated by the testing system 205 may be utilized as feedback by the neural network generator system 105 in generating subsequent generations of candidate neural network models according to the genetic algorithm(s) executed at the neural network generator system 105. While the testing system 205 is shown as a separate block in the illustration of FIG. 2, it should be appreciated that the functionality and logic of a testing system may be integrated with the functionality of a neural network generator system (e.g., 105) in some implementations, or hosted as separate logic on the same or an external system as the system hosting neural network generator system 105, among other example implementations.

In the example of FIG. 2, a neural network generator system 105 may include one or more data processing apparatus (e.g., 206) and one or more machine-readable memory elements (e.g., 208) to store and execute code (and/or drive hardware-implemented logic) to implement one or more modules of the neural network generator system 105. For instance, in some implementations, the neural network generator system 105 may support the automated generation of neural network candidates utilizing one or more grammatical evolution techniques. For instance, a grammatical evolution engine 210 may be provided to generate candidate neural network models automatically, based on one or more grammars (e.g., defined in grammar definition data 220). Each of the neural network models may be generated from a set of defined neural network building blocks, or neural network modules 215, and the grammar may be defined such that any neural network model built from the set of neural network modules 215 by the grammatical evolution engine 210 will be theoretically valid (although the level of accuracy and performance of the neural network models may vary wildly). The grammatical evolution engine may train a "generation" of candidate neural network models (e.g., using suitable training data 250 identified for use with such neural network models) and provide the generation of models for testing, such as by a network testing engine 265 of a testing system 205. For instance, network testing engine 265 may utilize validation or test data (e.g., 270) to test the accuracy of each of the individual neural network models generated by the grammatical evolution engine 210 from the designated set of network modules 215. In addition to accuracy, an example testing system (or the neural network generator system itself) may measure other attributes of each of the neural network models in a generation of models, such as the size of the neural network model (e.g., measured in the number of parameters of the neural network model), the memory utilized for storage of the model, the number of flops performed to execute the model, among other example attributes relating to the performance, complexity, and/or size of the neural network model.

The results of a neural network testing engine 265 may be provided as an input to an optimizer engine to determine which candidate neural network models (in the generated generation of models) are the best performing. In some implementations, the best performing neural networks may be determined according to a multi-objective optimization (e.g., performed using multi-objective optimizer 225). For instance, during testing (and potentially also generation) of the candidate neural network models, values for each of a set of multiple objectives may be determined. For instance, the objectives may include the accuracy of the neural network (e.g., determined by the neural network testing engine 265 based on tests performed using test data 270 provided as an input to each of the candidate neural networks) and at least one other objective not directly related to the model's accuracy, such as the size of the model, the computation and/or memory resources utilized to execute the model, the time required to execute the model, among other examples. In one example, the multi-objective optimizer 225 can take the multiple objective values for each of the candidate neural network models and determine a non-dominated front from the values and identify the subset of candidate neural networks that correspond to points on the non-dominated (e.g., Pareto) front.

Continuing with the example of FIG. 2, utilizing the results of the multi-objective optimizer 225, a network selection engine 245 of the grammatical evolution engine 210 may determine, which candidate neural networks of a current generation of candidate neural networks should be used to serve as "parents" or the basis of the next generation of candidate neural networks. In some implementations, the selected "parent neural networks" that were the best performing models of the preceding generation may be kept along with the children neural network models to collectively form the next generation of neural network models to be assessed by the testing system. This process may repeat for a determined number of generations to generate a set of final neural network models for potential adoption and use by corresponding applications and systems (e.g., 275). In some implementations, the evolutions of generations may continue until a threshold or level of convergence is observed, among other example implementations.

In one example, a grammatical evolution engine (e.g., 210) may include a parent network generator 235 to generate an initial generation of neural network model including a first number of neural network models. Like subsequent generation of neural networks to be generated by the grammatical evolution engine 210, the initial generation may be generated to include a variety of different versions of a neural network composed of network modules 215 according to a defined grammar. In some implementations, the initial generation may be generated by the parent network generator by randomly selecting values for each of the parameters dictating how the network modules are to be configured and interconnected to form a valid neural network as constrained by the defined grammar. In other instances, a set of known, well-performing neural network models or parameter values may be selected to generate the initial generation of models and effectively seed the successful evolution of subsequent generations of neural network models, among other example implementations. The initial generation (like all generations of the model derived using the grammatical evolution engine) may be trained and then tested to determine, based on multiple objectives, a subset of the initial generation of neural network models to be "kept" and serve as the basis for the next generation of neural network models. For instance, one or more children neural network models may be generated from each of the best performing subset of initial neural network models (e.g., by child network generator 240), for instance, by performing mutation operations according to an evolutionary computing algorithm to vary some of the parameters of the parent neural network model to derive a new child neural network model. These child neural network models may form at least a portion of the next generation of the neural network models (e.g., along with the selected best performing parent neural network models from the preceding generation) to be tested to determine which subset from this next generation should be selected (e.g., by network selection engine 245) as parents for the derivation (e.g., by child network generator 240) of the next generation's child neural network models, and so on.

A variety of different network models 215 may be defined and provided to be used by a grammatical evolution engine. By varying parameter values for a model, a potentially limitless variety of neural network models may be generated through various adjustments to the "template" network portions and various combinations of topologies formed from one or more multiple instances of each of the defined network portions represented by network modules 215. A grammar (e.g., 220) may be defined that corresponds to a particular set of network modules (e.g., 215), the grammar defining rules to be obeyed in assembling neural network models from the network modules and parameter values selected for the network modules, such that any neural network model generated by the grammatical evolution engine is at least theoretically valid (e.g., in that it will execute an operation to completion, with no guarantee for accuracy or efficiency in performance, etc.). Grammars may be defined to specify and correspond to particular different types of networks and embody knowledge for these network types that certain modules, attributes, topologies, etc. are needed and/or suspected to be necessary or important for the correct functioning of the network, among other features and example advantages. In some implementations, a neural network generator system 105 (or other system) may be provided with a tool (e.g., grammar builder 230) to build and/or edit grammars corresponding to particular types of neural network models. In some cases, the generation of optimized neural network models using the neural network generator system (e.g., through grammatical evolution engine 210) may reveal additional insights relating to the positive characteristics of a given neural network type and the corresponding grammar (e.g., 220) may be augmented (e.g., using grammar builder 230) to embed this new knowledge within the grammar for future use and consideration by the grammatical evolution engine 210. Additionally, as new network modules are developed, they be added to the set (e.g., 215) utilized by the neural network generator system and corresponding grammars (e.g., 220) may be developed or edited using grammar builder 230, among other examples.

As shown in the example of FIG. 2, when a "final" generation of neural network models is derived using an example grammatical evolution engine 210, one or more of these neural network models may be provided (e.g., over one or more networks (e.g., 112)) to one or more computing systems (e.g., 275), such as a compute subsystem of a machine (e.g., similar to the example machine 110 illustrated in FIG. 1) for consumption by a machine learning engine (e.g., 280) provided on the system 275 and implemented through one or more processors (e.g., 276) and memory elements (e.g., 278) and potentially other hardware present on the system 275. Similarly, logic of an example testing system (e.g., network testing engine 265) may also be implemented through one or more processors (e.g., 262) and memory elements (e.g., 264) and potentially other hardware present on a testing system (e.g., 205), among other example embodiments.

Figure 3:
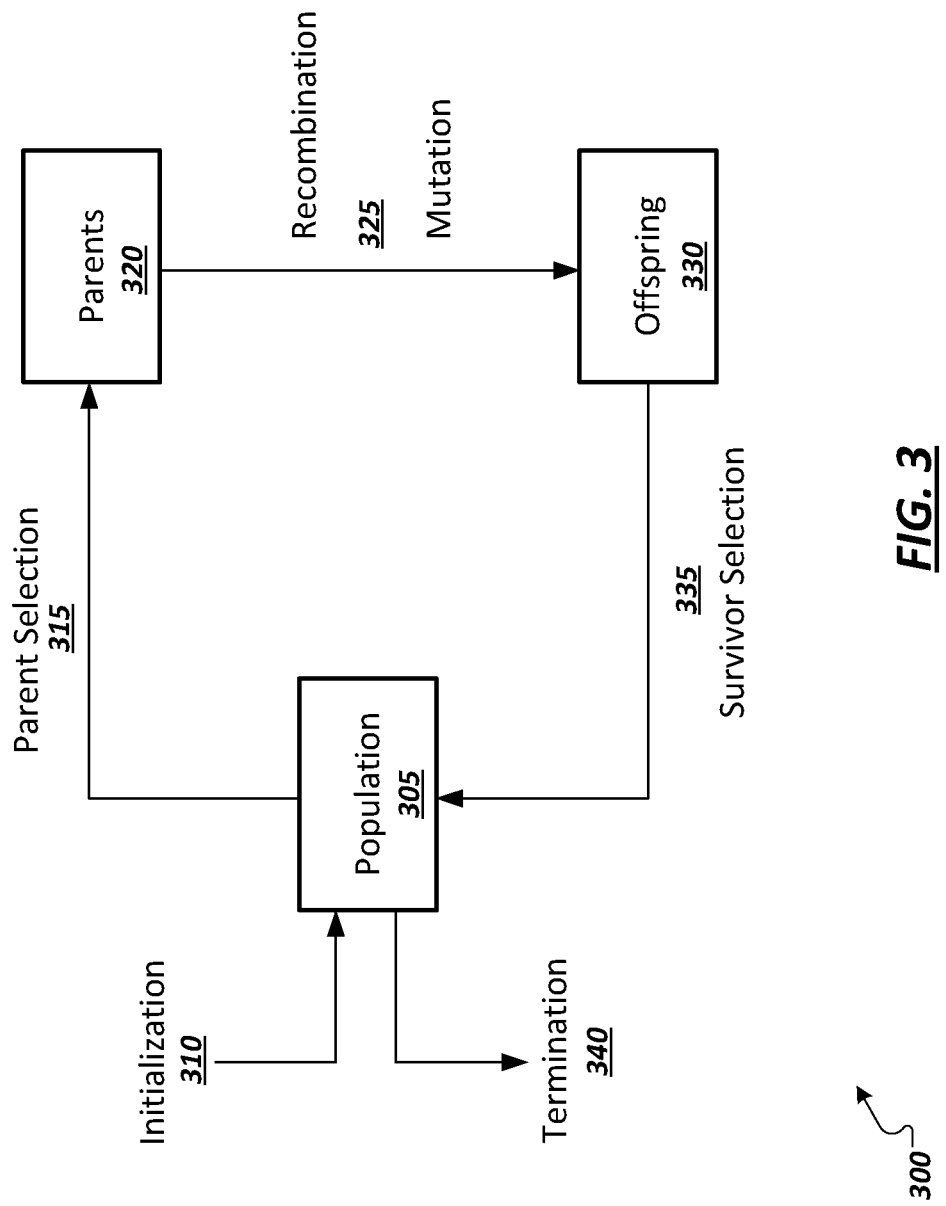
FIG. 3 is a simplified block diagram illustrating aspects of an example evolutionary algorithm.

Turning to FIG. 3, a simplified flow diagram 300 is shown illustrating the basic function of a generalized evolutionary algorithm. For instance, a population 305 of individual neural network models may be initialized 310 and each individual neural network model may be ranked based on a given fitness function (e.g., assessing the neural network model based on one or more objectives). The top-performing individuals, based on the fitness function, may be set aside (at 315) as parents 320 for the next generation. Next, variation operators 325, such as mutation and crossover, are applied to the parents 320 to create a new generation of offspring 330 (or "children" neural network models). Variation operators in evolutionary algorithms explore the search space by varying genetic material of individuals in order to explore new areas of the search space. Crossover randomly selects pairs of parents from the parent population created by the selection process and creates two children from these parents. Crossover techniques, which may be used by the grammatical evolution engine, may include fixed one-point crossover (e.g., where two children are created by selecting the same point on both parent genomes), fixed two-point crossover (e.g., where two children are created by selecting the same two or more points in both parent genomes), variable one-point crossover (e.g., where a different point in each genome is used to perform the crossover), and variable two-point crossover (e.g., where two or more different points are selected and used from each genome to perform the crossover), among other example techniques. Mutation techniques may also or instead be used to derive children models from parent neural network models. For instance, while crossover operates on pairs of selected parents to produce new children, mutation in grammatical evolution may operate on every individual in the child population after crossover has been applied. Mutation operators may be applied to the used portion of the genome, for instance, using a codon-based integer flip mutation (e.g., randomly mutating every individual codon in the genome with a certain probability) or a genome-based integer flip mutation (e.g., mutating a specified number of codons randomly selected from the genome), among other example techniques.

This procedure is repeated for a given number of "generations", with the intent being that the quality of the solutions represented by the fitness functions of each successive generation of offspring will increase. Surviving members of each generation may be likewise selected (e.g., 335), based on the relative performance of the member neural network models according to the fitness functions, and the cycle of evolution repeated until a desired or defined result or number of evolutions is completed. Upon reaching such a threshold, the evolution may terminate (e.g., at 340) and a set of resulting "optimized" neural network models may be presented for adoption and use by a consuming computing system. A variety of different approaches have been developed to search for optimal architectures and perform survivor and/or parent selection. For instance, evolutionary algorithms have been developed utilizing various fitness functions and mutation techniques.

Figure 4:
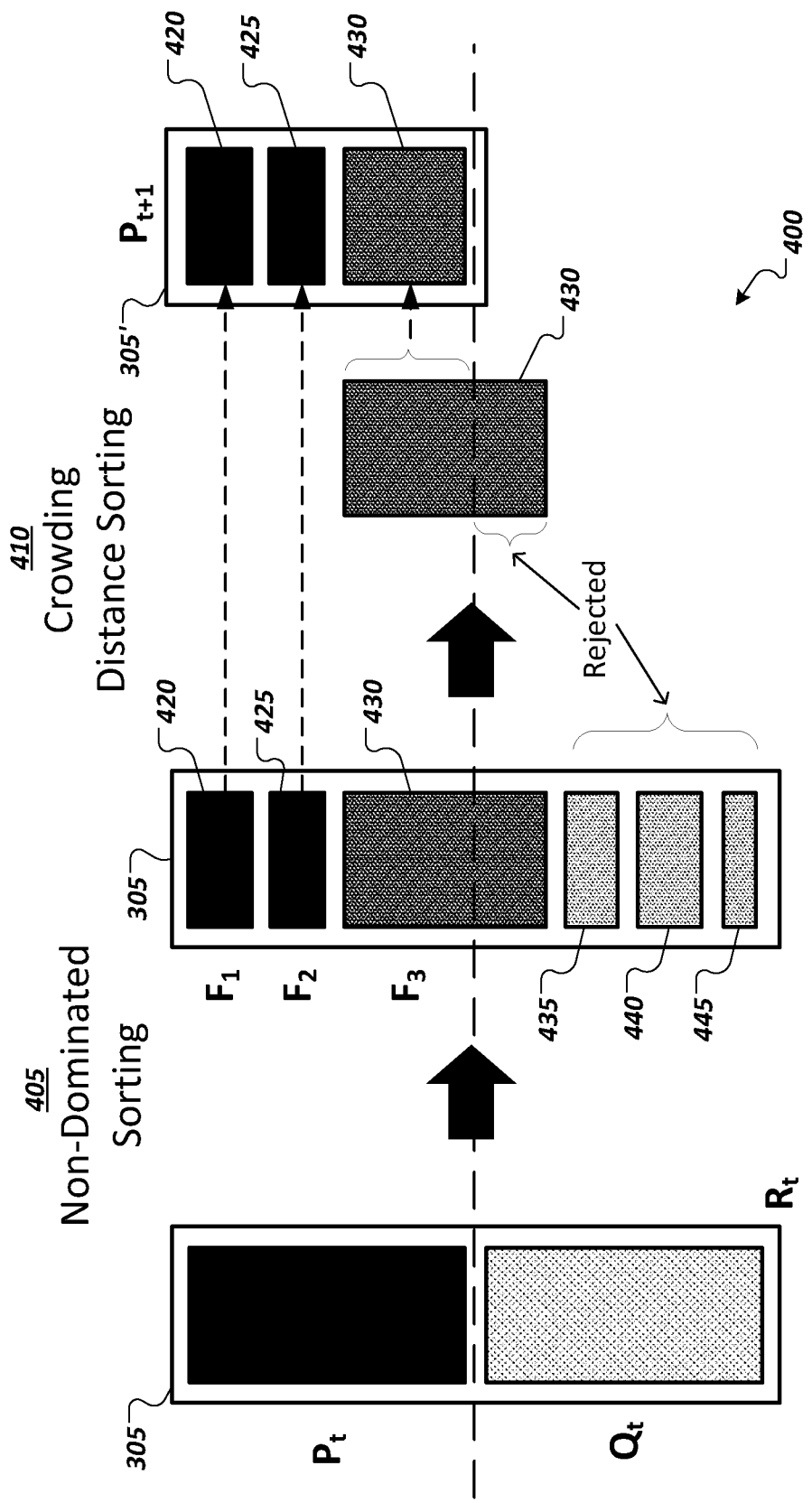
FIG. 4 is a simplified block diagram illustrating aspects of a multi-objective optimization utilized in selecting parent neural networks in an evolution.

FIG. 4 is a simplified block diagram 400 illustrating an example grammatical evolutionary technique to realize multi-objective optimization of convolutional neural networks, such as introduced above. In some implementations, a multi-objective optimization algorithm may be performed by an example grammatical evolution engine, such as the NSGA-II algorithm. In some implementations, the multi-objective optimization may attempt to optimize the objectives of size and accuracy of candidate convolutional neural networks generated using the grammatical evolution engine. This optimization may be carried out using a grammatical evolution approach implemented alongside a multi-objective optimization to determine a range of possible network topologies which best optimize the size/accuracy tradeoff, after a given number of generations.

As illustrated in the example of FIG. 4, an example multi-objective optimization may begin with the generation of a population 305 of neural network models. In some implementations, the initial population of size N is initialized from randomly-created individuals (within the problem range). This population may be tested (e.g., against a particular data set) to determine values for each of the multiple objectives (e.g., accuracy and size) for each individual neural network model. The population 305 may then be sorted (at 405), based on these determined objective values, into non-dominated fronts (e.g., 420, 425, 430, 435, 440, etc.). Each of the determined non-dominated fronts (e.g., 420, 425, 430, 435, 440, etc.) may be composed of individual neural network models which are not dominated by any other individual model from their, or any subsequent, front. For instance, a neural network model x1 is said to dominate another a neural network model x2 if x1 is no worse than x2 for all objectives and x1 is strictly better than x2 in at least one objective. Each front (e.g., 420, 425, 430, 435, 440) may be assigned a rank (e.g., first front (e.g., 420) is rank 1, second front (e.g., 425) is rank 2, etc.). Further, each individual neural network model may be assigned a crowding distance, which is defined as the sum (over all objectives) of the distance between its two closest neighbors in each objective. An individual at one of the endpoints of an objective is assigned a crowding distance of infinity. Selection of the "top" individuals may be performed (e.g., at 410) with the use of a random binary tournament, where one of two scenarios can arise: i) the individuals are of different rank, in which case the higher ranked individual wins; or ii) the individuals are of the same rank, in which case the individual with the larger crowding distance wins. In this example, a population (e.g., 305') of size 0.5N is to be left after selection. As shown in the example of FIG. 4, in some cases, crowding distance sorting (e.g., 410) performed to facilitate the selection, may result in some individuals from a given front (e.g., 430) being rejected, while others are preserved in the selected population (e.g., 305'). Variation operators (e.g., crossover, mutation, etc.) may then be applied to this selected population (e.g., 305'), for instance, within specified probability distributions, to create a population of offspring. For instance, a population of offspring of size 0.5N may be generated from the selected population 305' and may be combined with the selected population to form a next generation of candidate neural network models of size N, among other example implementations, and optimization and evolution techniques.

Multi-objective optimization, such as illustrated in the example of FIG. 4 and implemented in at least some of the system implementations discussed herein, may be used to enhance a grammatical evolution technique by providing elitism, such that the best solutions at each generation are preserved and not mutated, which may work to increase convergence in multi-objective evolutionary algorithms. Additionally, such techniques may be diversity-preserving through determining and using crowding distance within the populations to perform the selection process. Such approaches may work to emphasize less crowded solutions and maintain a wide spread in the solution space, among other example benefits and implementation features.

As introduced above, in some implementations, a set of neural network modules, or building blocks, may be constructed and designed and provided for use by a neural network generator system to construct a wide-ranging variety of candidate neural network models within a population according to a corresponding, defined grammar. The set of neural network modules provided to automatically generate optimized versions of a particular type of network, which may include one or more multiple different modules, which may be configurable based on various attributes which may be adjusted (e.g., each attribute value representing a specific "codon" in the candidate neural network model's overall "genome").

Figure 5:
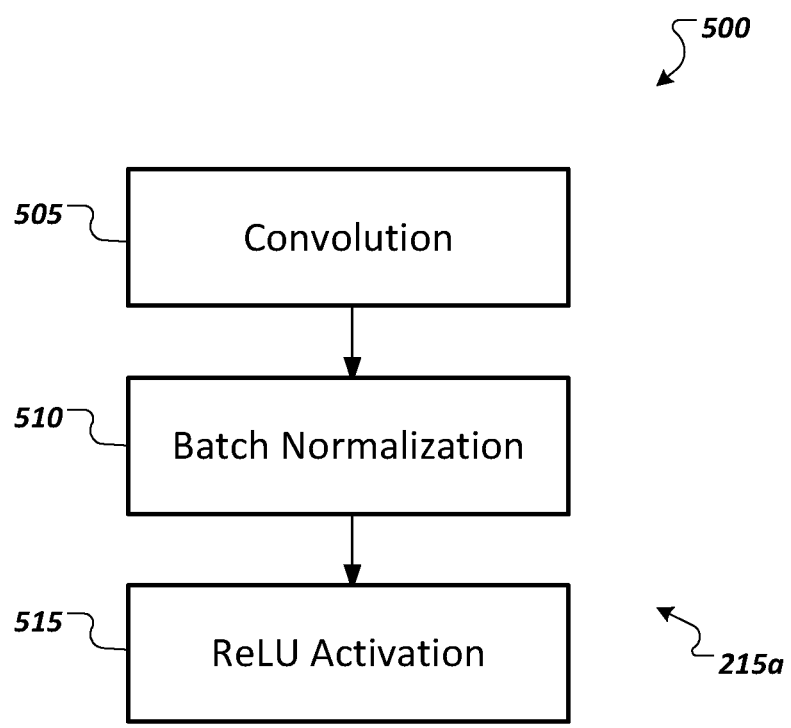
FIG. 5 is a simplified block diagram illustrating an example network module.
Figure 6:
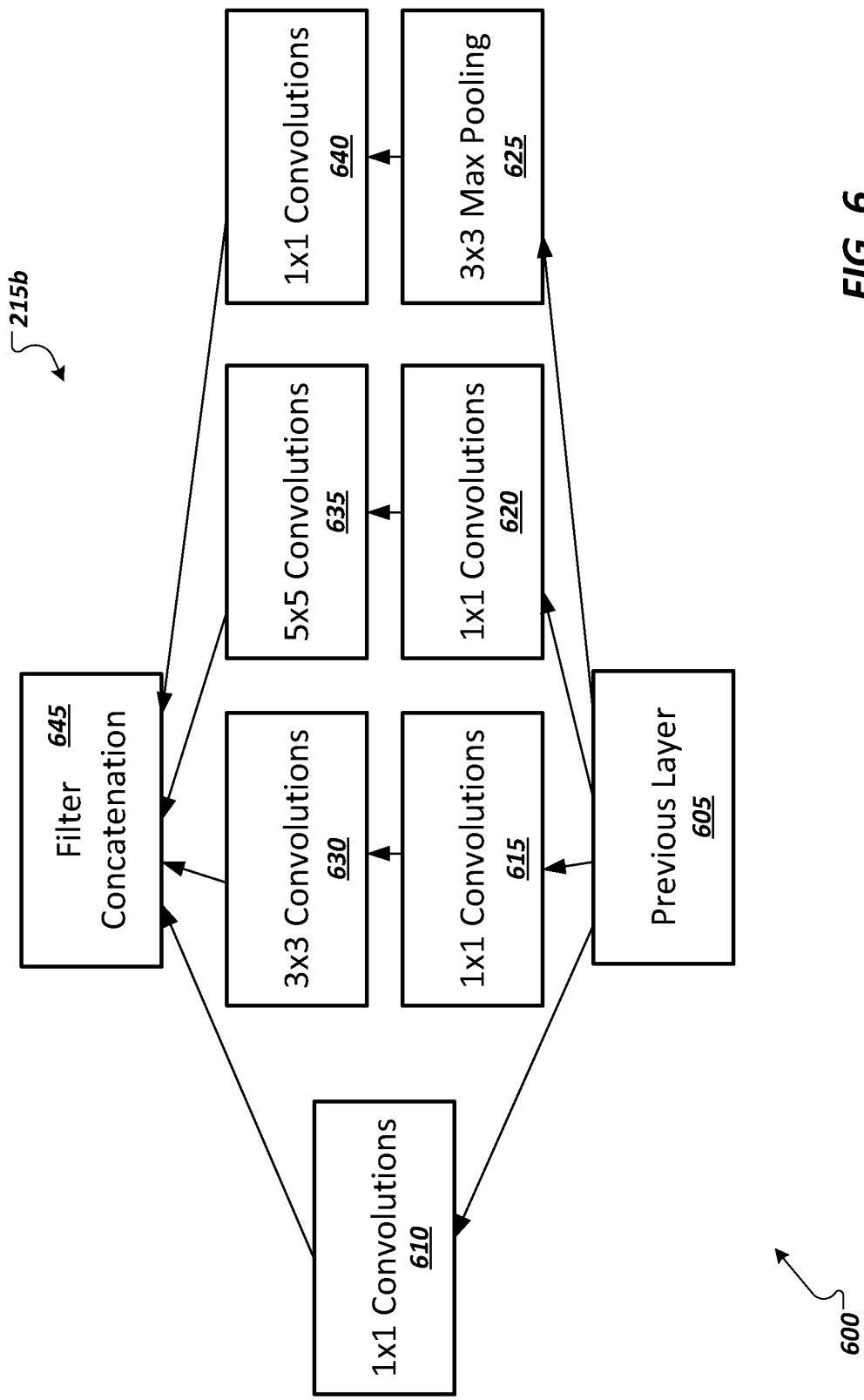
FIG. 6 is a simplified block diagram illustrating another example network module.

In one example implementation, a type of network to be generated using an example neural network generator system may utilize a set of two building blocks, or modules, to construct all the candidate neural networks to be considered in a grammatical evolution approach. For instance, the set of the neural network modules may include a convolution block (CB) module and an inception block (IB) module. FIG. 5 is a simplified block diagram 500 illustrating the composition of the convolution block (e.g., 215a). For instance, a convolution block 215a may include configurable convolution layers (e.g., 505), a configurable batch normalization layer (e.g., 510), and an activation function layer 515 (e.g., a rectified linear unit (ReLU) activation layer), among other example implementations. Turning to FIG. 6, another simplified block diagram 600 illustrates the example composition of an implementation of an inception block module (e.g., 215b). In one example, the inception block module may be based on blocks within the GoogLe-Net network architecture, among other example implementations. For instance, in the example of FIG. 6, an inception block module may connect to an input or other previous layer (e.g., 605) and utilize 1×1 convolution layers (e.g., 610, 615, 620) and a 3×3 max pooling layer 625. One of the 1×1 convolution layers (e.g., 615) may feed into a 3×3 convolution layer 630, another 1×1 convolution layer (e.g., 620) may feed a 5×5 convolution layer 635, and the max pooling layer may provide inputs to a further 1×1 convolution layer (e.g., 640), in this example. The outputs of these last layers in the block (e.g., 610, 630, 635, 640) may be provided to a filter concatenation layer (e.g., 645). The individual layers (e.g., 610-645) may be configurable through adjustment to respective sets of variables/attributes corresponding to each layer.

Additional modules or neural network structures may be included by a neural network generator based on a corresponding grammar. For instance, continuing with the example of FIGS. 5-6, the neural network generator may be configured to add fully-connected (FC) layers between the output of the last (CB or IB) module and a softmax layer. In one implementation, to ensure dimensionality reduction, a max-pooling layer may be inserted after the first block, and then after every second block for the CB networks, and after every third block for the IB networks. Table 1 shows example specifications for variables to be applied in the automated construction of such candidate neural network models. In Table 1, for any one row in the table, the grammar is used to generate a phenotype which selects values from the given ranges, and creates a network with them.

TABLE 1

Network architecture specifications

| Network Module Type | Dataset | CB range | IB range | FC range | Kernels (FC1) | Kernels (FC2) | MaxPool layer location |
| --- | --- | --- | --- | --- | --- | --- | --- |
| ConvolutionBlockNet | CIFAR10 | 1-3 | — | 0-2 | 100-400 | 40-70 | every $2^{nd}$ block |
| ConvolutionBlockNet | STL10 | 3-6 | — | 0-2 | 100-400 | 40-70 | every $2^{nd}$ block |
| InceptionBlockNet | CIFAR10 | — | 4-8 | 0-1 | 100-500 | | every $3^{rd}$ block |
| InceptionBlockNet | STL10 | — | 5-9 | 0-1 | 100-500 | | every $3^{rd}$ block |

An example grammar, corresponding to the examples of FIGS. 5-6, and showing how parameters may be defined and selected, is shown as follows:

```
<settings> ::= fc = <fc_range> {::}
    pre_layer * MOO
    inception_blocks = [ ]{::}
    fc_layers = [ ]{::}
    <inception_blocks> {::}
    <pre_layer> {::}
    <flfc-code> {::}
<pre_layer> ::= pce_layer.append((<n_pre_layer_range>)){::}
<n_pre_layer_range> ::= 128 | 160 | 192
<n1x1 range> ::= 112 | 128 | 160
<n3x3red_range> ::= 96 | 112 | 128
<n3x3_range> ::= 196 | 224 | 256
<n5x5red_range> ::= 16 | 24 | 32
<n5x5_range> ::= 48 | 64 | 96
<inception_blocks> ::= <ib><ib><ib> | <ib><ib><ib><ib> | <ib><ib><ib><ib><ib> |
<ib><ib><ib><ib><ib><ib> | <ib><ib><ib><ib><ib><ib><ib>
<ib> ::= inception_blocks.append([(<n1x1_range>), (<n3x 3red_range>), (<n3x 3_range>),
(<n5x5red_range>)* (<n5x5_range>)]) {::}
<fc_range> ::= 0|1
<flfc-code> ::= fc_layers.append(<fc_hidden_range>) {::}
<fc_hidden_range> ::= 100 | 101 | 102 | 103 | 104 | 105 | 106 | 107
| 108 | 109 | 110 | 111 | 112 | 113 | 114 | 115 | 116 | 117 | 118 | 119 | 120 | 121 | 122 |
123 | 124 | 125 | 126 | 127 | 128 | 129 | 130 | 131 | 132 | 133 | 134 | 135 | 136 | 137 | 138
| 139 | 140 | 141 | 142 | 143 | 144 | 145 | 146 | 147 | 148 | 149 | 150 | 151 | 152 | 153 |
154 | 155 | 156 | 157 | 158 | 159 | 160 | 161 | 162 | 163 | 164 | 165 | 166 | 167 | 168 | 169
| 170 | 171 | 172 | 173 | 174 | 175 | 176 | 177 | 178 | 179 | 180 | 181 | 182 | 183 | 184 |
185 | 186 | 187 | 188 | 189 | 190 | 191 | 192 | 193 | 194 | 195 | 196 | 197 | 198 | 199 | 200
| 201 | 202 | 203 | 204 | 205 | 206 | 207 | 208 | 209 | 210 | 211 | 212 | 213 | 214 | 215 |
216 | 217 | 218 | 219 | 220 | 221 | 222 | 223 | 224 | 225 | 226 | 227 | 228 | 229 | 230 | 231
| 232 | 233 | 234 | 235 | 236 | 237 | 238 | 239 | 240 | 241 | 242 | 243 | 244 | 245 | 246 |
247 | 248 | 249 | 250 | 251 | 252 | 253 | 254 | 255 | 256 | 257 | 258 | 259 | 260 | 261 | 262
| 263 | 264 | 265 | 266 | 267 | 268 | 269 | 270 | 271 | 272 | 273 | 274 | 275 | 276 | 277 |
278 | 279 | 280 | 281 | 282 | 283 | 284 | 285 | 286 | 287 | 288 | 289 | 290 | 291 | 292 | 293
| 294 | 295 | 296 | 297 | 298 | 299 | 300 | 301 | 302 | 303 | 304 | 305 | 306 | 307 | 308 |
309 | 310 | 311 | 312 | 313 | 314 | 315 | 316 | 317 | 318 | 319 | 320 | 321 | 322 | 323 | 324
| 325 | 326 | 327 | 328 | 329 | 330 | 331 | 332 | 333 | 334 | 335 | 336 | 337 | 338 | 339 |
340 | 341 | 342 | 343 | 344 | 345 | 346 | 347 | 348 | 349 | 350 | 351 | 352 | 353 | 354 | 355
| 356 | 357 | 358 | 359 | 360 | 361 | 362 | 363 | 364 | 365 | 366 | 367 | 368 | 369 | 370 |
371 | 372 | 373 | 374 | 375 | 376 | 377 | 378 | 379 | 380 | 381 | 382 | 383 | 384 | 385 | 386
| 387 | 388 | 389 | 390 | 391 | 392 | 393 | 394 | 395 | 396 | 397 | 398 | 399 | 400 | 401 |
402 | 403 | 404 | 405 | 406 | 407 | 408 | 409 | 410 | 411 | 412 | 413 | 414 | 415 | 416 | 417
```

| 418 | 419 | 420 | 421 | 422 | 423 | 424 | 425 | 426 | 427 | 428 | 479 | 430 | 431 | 432 |
433 | 434 | 435 | 436 | 437 | 438 | 439 | 440 | 441 | 442 | 443 | 444 | 445 | 446 | 447 | 448
| 449 | 450 | 451 | 452 | 453 | 454 | 455 | 456 | 457 | 458 | 459 | 460 | 461 | 462 | 463 |
464 | 465 | 466 | 467 | 468 | 469 | 470 | 471 | 472 | 473 | 474 | 475 | 476 | 477 | 478 | 479
| 480 | 481 | 482 | 483 | 484 | 485 | 486 | 487 | 488 | 489 | 490 | 491 | 492 | 493 | 494 |
495 | 496 | 497 | 498 | 499

As another example, the example grammar above may be augmented to consider further variable parameters (e.g., learning parameters), which may be similarly manipulated by an example neural network generator system to generate populations of candidate neural networks:

```
<batch_size> ::= batch_size.append(<bs_range>){::}
<bs_range> ::= 64 | 128 | 256
<optimizer> ::= optim.append(torch.optim.<optim_type>){::}
<optim_type> ::= SGD | Adam | RMSprop
<learning_rate> ::= lr.append(<lr>){::}
<lr> ::= 0.001 | 0.01 | 0.1
<weight_decay> ::= weightdecay.append(<wd_range>)
<wd_range> ::= 0.0001 | 0.0005 | 0.001 | 0.005 | 0.01
<momentum> ::= momentum.append(<momentum_range>)
<momentum_range> ::= 0.8 | 0.85 | 0.9
<dropout> ::= dropout.append(<dropout_range>)
<dropout_range> ::= 0.2 | 0.3 | 0.4 | 0.5
```

A grammar may additionally define how filters (e.g., size and implementation) are to be applied at each layer within the model's architecture. Continuing with the example above, in one implementation, a grammar may define that all MaxPool filters are of size 2×2 with stride 2, that all convolutional filters in the ConvolutionBlockNets are either 3×3 or 5×5 (e.g., chosen at random by the grammar with a 50% chance for each) with stride 1, and that all convolutional filters in the InceptionBlockNets have defined sizes/ properties (e.g., as defined in the corresponding GoogLeNet architecture), among other example implementations.

Further, in addition to the definition of all topological hyper-parameters (and the range of values they can take) for the network modules to be used by the grammatical evolution engine, another aspect of the networks to be defined to obtain fully coherent, functioning architectures may be the number of channels going in and out of each convolutional layer. This may be addressed differently depending on the respective block type(s) used to build an individual candidate network. For instance, in CB network modules, the first layer may be defined to map three RGB channels to 32 output channels, and each subsequent layer may output double the number of input channels (e.g., 64 for the second layer, 128 for the third, etc.). In some instances, the number of channels in and out of a convolutional layer at any given position in a CB network module is effectively fixed. In the case of the example IB network module (e.g., illustrated in FIG. 6), channel values may be defined for each of the six convolutions happening inside each block. In one example, these values may be fixed for the first block, but vary as part of the phenotype constructed by the grammar. As an illustrative example, Table 2 shows example information regarding output channel values for each convolution in an example IB network module. In Table 2, a convolution is referred to as A×A B, where A×A is the size of the filter and B is the branch index. With reference to FIG. 6, branches indicated in Table 2 2, are numbered 1 through 4 starting from the left. In some implementations, the fixed first block values in an example IB network module may be defined to be identical to those defined in the first inception module in GoogleNet, among other example implementations. Further, in this example the input to each inception module is a concatenation of 1×1 1, 3×3 2, 5×5 3 and 1×1 4. However, the 3-channeled RGB images are not fed directly into the first inception block; a preliminary 3×3 convolutional block is inserted in between these two, with the number of output channels equal to 128, 164, or 196, among other examples.

TABLE 2

Inception Block Convolution Channels

| Convolution | First Block Value | Possibilities for Subsequent Blocks |
| --- | --- | --- |
| 1 × 1.1 | 64 | 112/128/160 |
| 1 × 1.2 | 96 | 96/112/128 |
| 3 × 3.2 | 128 | 196/224/256 |
| 1 × 1.3 | 16 | 16/24/32 |
| 5 × 5.3 | 32 | 48/64/96 |
| 1 × 1.4 | 32 | 64 |

In other examples, the search space considered by the grammar may be expanded to include variations in learning parameters. The topology of the networks evolved may remain identical (e.g., all the parameter choices/ranges defined in the above example may remain true), as well as the evolutionary parameters used. As a result, even when the search space is expanded, the same number of individuals may be generated during the generation (e.g., 240 individuals from 15 generations of 15 individuals, among other examples). For instance, Table 3 shows example expanded parameters, such as learning parameters, which may be included in evolutions generated by an example neural network generator system, as well as the allowed values of these example parameters.

TABLE 3

Learning Parameters

| Parameter | Allowed Values |
| --- | --- |
| Optimizer | Adam/Stochastic Gradient Descent (SGD)/RMSprop |
| Learning Rate | 0.001/0.01/0.1 |
| Batch Size | 64/128/256 |
| Weight Decay | 0.0001/0.0005/0.001/0.005/0.01 |
| Momentum | 0.8/0.85/0.9 |
| Dropout Rate | 0.2/0.3/0.4/0.5 |

In some implementations, the manner in which a candidate neural network, generated by an example grammatical evolution engine, is trained, may be based on the number and types of modules (from the set of network modules) used to construct the neural network. Indeed, multiple instances of the same module, a combination of different modules, etc. may be utilized by the grammatical evolution engine to generate a given candidate neural network. Training may be impacted, for instance, in that longer training may be conducted (e.g., measured in epochs) when certain modules are included within a given candidate neural network. As an illustrative example, neural networks based on CB network modules (e.g., without IB network modules) may be trained for 15 epochs, while network models including IB network modules may be trained for 20 epochs, among other examples.

A variety of different training data sets may be utilized to train (and/or test) the various type of neural network model generations generated by an example neural network generator system. In one example, the evolution process may be carried out on multiple different datasets. In one implementation, the datasets CIFAR10 and STL10 may be used, CIFAR10 composed of 32×32 RGB images, split into 10 classes (e.g., airplane, car, bird, cat, deer, dog, frog, horse, ship, and truck), with 5,000 training and 1,000 test images per class, for a total of 60,000 images. The STL10 dataset is inspired by CIFAR10, but the images are 96×96 RGB, with some differences in classes (e.g., "frog" class is replaced by a "monkey" class). In one example, datasets may be split into training and testing data. For instance, in the examples of CIFAR10 and STL10, the train/test split may comprise 500 training and 800 test images in each class, for a total of 13,000 labeled images. In some cases, unlabeled data may be used, so as to test the evolved networks' ability to generalize. In some cases, the training and/or test data used may be adapted to the processing resources available on the system (e.g., a resource-constrained system may be incapable of training using the full ImageNet dataset).

Figure 7B:
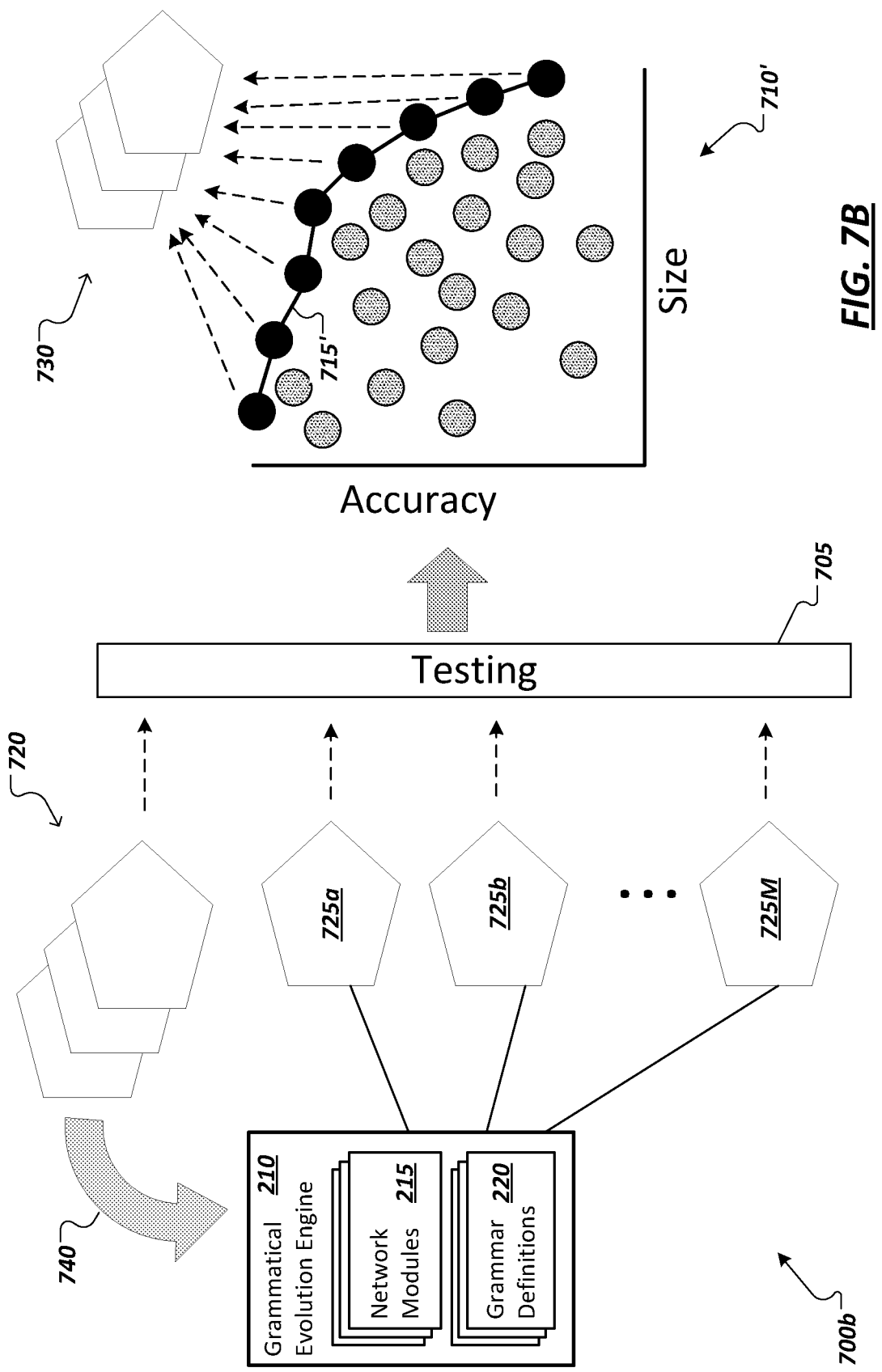

Turning to FIGS. 7A-7B, simplified block diagrams 700a-b are shown illustrating an example generation of neural network models by a neural network generator system utilizing grammatical evolution (using a set of network modules (e.g., 215)) and multi-objective optimization for use by model-consuming computing systems. FIG. 7A represents the generation of an initial set of candidate neural network models (e.g., 125a-N) by a grammatical evolution engine, where each of the initial set of candidate neural network models (e.g., 125a-N) is constructed from a respective combination of instances of one or more of the network modules 215. The selection of the module combinations and setting of parameters of these module instances may be based on a grammar (e.g., 220). In some implementations, the genomes determined for this initial set of candidate neural network models (e.g., 125a-N), and the corresponding topologies and parameter values, may be determined by the grammatical evolution engine 210 at random. Generation of the initial set of candidate neural network models (e.g., 125a-N) may additionally include training of the neural network models using a particular training data set.

With the initial set of candidate neural network models (e.g., 125a-N) generated and trained, the initial set of candidate neural network models (e.g., 125a-N) may be subjected to testing 705 (e.g., according to a defined fitness function). In the example illustrated in FIGS. 7A-7B, the fitness function may consider a combination of multiple (competing) objectives, such as the accuracy of each candidate neural network model (e.g., 125a-N) and the respective size (e.g., measured in parameters) of each candidate neural network model, among other potential examples (including examples where optimization considers three or more objectives). As illustrated in FIG. 7A, values of each of the multiple objectives for each of the trained candidate neural network models (e.g., 125a-N) may be determined (e.g., as represented in graph 710 (where size decreases along the positive x-axis and accuracy increases along the positive y-axis)) through the testing 705. A front 715 (e.g., a non-dominated front, Pareto front, etc.) may be determined among the objective values (e.g., 715) and serve as the basis for selecting surviving members 720, or parents, from the generation of candidate neural network models (e.g., 125a-N), such as discussed above.

Turning to FIG. 7B, the grammatical evolution engine 210 may utilize (at 740) the selected surviving members (e.g., 720) of a preceding generation of candidate neural network models (e.g., either the initial generation of randomly-generated neural network models or a generation evolved from the initial generator or another preceding generation) to evolve, or generate, the next generation of candidate neural network models. For instance, the grammatical evolution engine 210 may generate one or more children neural network models (e.g., 725a-M) by performing variation operations (e.g., crossover, mutation, etc.) on the genomes of the surviving members 720, now serving as parents for the next generation of candidate neural network models, such as discussed above. One or multiple children neural network models 725a-M may be generated from each parent neural network (e.g., in set 720), based on the evolutionary algorithm applied. As with the parent neural network, mutations or other variation operations may be bound to comply with requirements defined in the associated grammar. Additionally, based on the results of the variation operations, corresponding network modules (e.g., 215) may be selected and associated parameters set to automatically build the corresponding child neural network model (e.g., 725a-M).

Continuing with the example of FIG. 7B, in some implementations, the next generation of candidate neural networks to be considered by the grammatical evolution engine 210 may be composed of not only the children neural networks (e.g., 725a-M) formed for this new generation of models, but may also include the parents of these children neural networks, namely the subset of candidate neural network models (e.g., 720), which survived the preceding generation. In other implementations, a next generation may be composed of purely children neural networks generated from such selected parent neural networks (from the preceding generation of models), among other example embodiments. In the example shown in FIG. 7B, both the parent models (e.g., 720) and their cumulative children neural network models (e.g., 725a-M) may form the next generation and may be similarly subjected to testing (e.g., 705) using a fitness function (e.g., the same, or even a different, fitness function as applied in the preceding generation). As shown in the example of FIG. 7B, the same testing (e.g., 705) may be applied to this current generation of models to determine a distribution of values (e.g., as shown in graph 710') of the multiple objectives being weighed for each of the neural network models (e.g., 720, 725a-M).

It may be expected or intended that the evolutions performed by the grammatical evolution engine 210 will result in generalized improvements in performance from generation to generation, as illustrated through a comparison of graphs 710 and 710'. For instance, as shown in FIG. 7B, a subsequent generation may demonstrate a general increase in accuracy over the preceding generation, all while achieving a generalized (e.g., average) decrease in model size (e.g., as reflected in the curve of the corresponding optimization front 715' determined from the distribution). Based on this newly determined front 715' for the current generation, surviving members (e.g., 730) of this generation may again be selected (e.g., based on corresponding models' objective values lying on the front 715') to serve as parents for the next generation to be tested. In cases where the current generation is determined to be the final generation to be considered by the grammatical evolution engine 210, the "final" set of neural network models may be determined to include those corresponding to points on the non-dominated front determined for this final generation of neural network models. In some implementations, an additional selection algorithm may be executed (e.g., by the grammatical evolution engine 210 or another logic module of an example neural network generator system) to select a particular one of the (multiple) neural network models included in this final set of neural network models to be the "best" or "final" neural network model, among other example implementations. Such final neural network models may then be made available to be loaded and executed by consuming computing systems, for instance, to assist in performing computer vision tasks, classifications, or other machine learning tasks.

As noted above, due to the functioning of a multi-objective optimization algorithm (e.g., NSGA-II) by a neural network generator system, optimization of conflicting objectives may be expected to improve from generation to generation. In some cases, the number of individuals on the first fronts determined for each generation may vary from one experiment to the next, depending on the nature of the solutions generated in each case. In one illustrative example, a preceding generation of candidate neural network models may detect a smallest network (e.g., ~2 million parameters) on the first front having a validation accuracy of 60%, whilst the one on the last front, which is approximately the same size, has a validation accuracy of 83%. Similarly, the highest accuracy networks may not only show small, gradual increases in accuracy from one generation to the next, but also progressive decreases in size among the most accurate candidate networks in the generation. As an example, in an initial or other preceding generation, the network with the highest accuracy from the first front (84.5%) may have ~5.7M parameters, with this going down to ~2.7M parameters on the last front, while retaining comparable accuracy, among other illustrative examples.

Tables 4 and 5 illustrate example parameters, which may be determined for an example "final" set of neural network models determined following a number of evolutions using an example grammatical evolution engine. In Table 4, the determined network architectures are described, where C X represents a convolution module with filter of size X, and FC X represents a fully connected layer with X kernels. For inception blocks, only the total number of blocks is indicated (equal to X in the XIB term). The number of channels out of the preliminary layer is denoted in this particular example by X in the PRE X part of the inception architectures. Table 5 gives the learning parameters associated with each network in the second experiment, as encoded by the associated grammar, among other examples:

TABLE 4

Architectures of Example "Final" Neural Networks

| Network Type | Dataset | Network | Architecture | Size (parameters) | Validation Accuracy (%) |
|---|---|---|---|---|---|
| ConvolutionBlockNet | CIFAR10 | 1 | C_3_C_3_C_3_FC_186 | 691,324 | 73.60 |
| — | — | 2 | C_3_C_3_C_3 | 125,706 | 73.42 |
| ConvolutionBlockNet | STL10 | 1 | C_5_C_3_C_5_C_5 | 1,701,642 | 58.43 |
| — | — | 2 | C_3_C_5_C_3 | 638,474 | 55.21 |
| InceptionBlockNet | CIFAR10 | 1 | PRE_192_4IB | 1,697,070 | 83.85 |
| — | — | 2 | PRE_160_4IB | 1,692,710 | 83.83 |
| InceptionBlockNet | STL10 | 1 | PRE_160_6IB | 2,707,510 | 64.21 |
| — | — | 2 | PRE_128_7IB | 2,698,382 | 60.66 |

TABLE 5

Learning Parameters of Example "Final" Neural Networks

| Network Type | Dataset | Network | Optimizer | Learning Rate | Momentum | Weight Decay | Batch Size |
|---|---|---|---|---|---|---|---|
| ConvolutionBlockNet | CIFAR10 | 1 | SGD | 0.1 | 0.85 | 0.0001 | 256 |
| — | — | 2 | SGD | 0.1 | 0.85 | 0.0001 | 256 |
| ConvolutionBlockNet | STL10 | 1 | SGD | 0.01 | 0.85 | 0.0005 | 256 |
| — | — | 2 | SGD | 0.01 | 0.85 | 0.01 | 256 |
| InceptionBlockNet | CIFAR10 | 1 | SGD | 0.01 | 0.90 | 0.001 | 64 |
| — | — | 2 | SGD | 0.01 | 0.90 | 0.001 | 64 |
| InceptionBlockNet | STL10 | 1 | SGD | 0.01 | 0.90 | 0.005 | 64 |
| — | — | 2 | SGD | 0.01 | 0.90 | 0.005 | 128 |

In the example of Tables 4 and 5, both architectural and learning parameters may be configurable (as defined in an associated grammar) and utilized by a grammatical evolution engine in generating generations of neural network models. Changing the number and types of parameters may lead to comparably dissimilar "final" generations of neural network models. Accordingly, in some cases, a grammatical evolution engine may perform multiple evolutions, using a first set of parameters and one or more others using different (e.g., expanded) sets of parameters to expand the search space and thereby expand the number and variety of "final" neural network models generated, among other example implementations.

As highlighted above, an improved neural network generator system may perform automatic generation of neural network models for a solution through the combination of grammatical evolution (GE) and multi-objective optimization techniques to automatically search for optimal ANN topologies. The neural network models may be built using sets of different types of network modules (e.g., convolution blocks and inception blocks) and a corresponding grammar. Evolutions may be carried out through varying either strictly topological parameters or both topological and learning parameters, as well as use various datasets (e.g., CIFAR10 and STL10) for network training and validation testing. The implementation of neural network evolution based on multi-objective optimization may not yield state of the art architectures, but may nonetheless seize on important opportunities to improve other valuable characteristics of a neural network (e.g., size, processing or memory footprint, etc.) in competition with accuracy. For instance, such evolution may discover small changes which can be made to a network to drastically reduce its size, at the expense of very little accuracy. Therein lies the danger of optimizing strictly with regard to validation accuracy: traditional neural network evolutionary techniques may seek to optimize with no interest in the size of the network and thereby miss opportunities to very easily cut a great deal of parameters and thus improve the efficiency of the networks it is attempting to generate, among other beneficial examples.

It should be appreciated that the examples presented above are non-limiting examples provided to illustrate certain general features and functionality of example improved systems. For instance, changes may be made to some of the simplified examples described herein without departing from the scope or principles discussed herein. For instance, evolutions may be run with various (and increased) numbers of generations (e.g., to further improve the quality of the solutions forming the final Pareto front), utilizing different or additional network modules (e.g., ResNet connections, Dense cells, etc.) and corresponding grammars to generate candidate neural networks, varying other or additional learning parameters in the evolutions, crafting grammars with more or less flexibility for resulting sequences formed from such network modules, performing training using different training data or for longer or fewer epochs, utilizing different test data, and utilizing different multi-objective optimization algorithms to determine parent neural network models, among other example alternative features.

FIG. 8 is a simplified flow diagram 800 illustrating an example technique for automatically generating a set of one or more neural network models utilizing grammatical evolution performed by a computing system. For instance, an initial set of parent neural network models may be generated 805 (or otherwise obtained (e.g., as results from previous evolutions)). Where the initial set of parent neural network models are generated, they may be generated based on a grammar used in the grammatical evolution. In some implementations, the grammar may be associated with a set of network modules to be used to construct candidate neural networks in the evolutions. In one example, the initial set of parent neural network models may be generated from the set of network modules using randomly selected parameters and in accordance with the grammar. With the initial parent neural networks generated, they may be trained (e.g., 810) using a set of training data (e.g., and backpropagation), among other examples. In cases where one or more of the initial parent neural networks include previously generated and trained neural networks, such neural networks may not need to be retrained. The collection of generated and/or accessed initial parent neural networks may form an initial generation of neural networks.

This initial generation of neural networks may be subjected to a test (at 815), using test data, to determine the respective validation accuracy of each of the networks in the initial generation. Other attributes may be determined along with validation accuracy (e.g., during testing, training, and/or generation of the corresponding network), such as the size of the network (e.g., measured in the number of parameters in the neural network model). The validation accuracy and other attribute values determined for each neural network may form a multi-attribute or objective attribute value set, which may be utilized as an input to a multi-objective optimization performed 820 by the system. For instance, a Pareto frontier, one or more non-dominated fronts, etc. may be determined for the generation based on the collection of attribute value sets determined for each respective one of the generation of the neural networks. The best performing networks may be determined from the results of the multi-objective optimization 820 (e.g., based on an attribute value set of a particular one of the neural networks lying on a non-dominated front). Based on the results of the multi-objective optimization, a subset of the initial generation of the neural networks may be selected 825 to "survive" and/or serve as parents of a next generation of neural networks.

Continuing with the example of FIG. 8, upon selecting a subset of neural network models from an initial (or other preceding) generation, it may be determined (at 830) whether this is the last generation in the evolution. This determination 830 may be based on the generation being the predetermined n-th generation that is to serve as the final generation or based on results of the multi-objective optimization performed for the generation (e.g., showing that a threshold degree of convergence or performance (based on one or more of the objectives being optimized) has been reached), among other examples. Where the generation represents the final generation in the evolution, the subset of neural network models determined for that generation may be designated 850 as the "final" neural networks to be output by the evolution process. Where additional generations are to be built and tested, further evolutions may be performed by the system. For instance, grammatical evolution of the subset of neural networks may be performed 835 to generate child neural networks for inclusion in the next generation of networks. These child neural networks may be trained 840 (e.g., using the same training data used to train preceding generations of models in the evolution) and then used (e.g., together with the child networks' parent networks selected from the preceding generation) to form 845 the next generation of neural networks. This next generation of neural networks may be likewise tested (at 815) and subjected to multi-objective optimization (at 820) to select 825 a best performing subset of networks within this next generation, and so on until the final generation and final neural networks are determined (e.g., at 850).

While some of the systems and solution described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

FIGS. 9-15 are block diagrams of exemplary computer architectures that may be used in accordance with embodiments disclosed herein. Indeed, computing devices, processors, and other logic and circuitry of the systems described herein may incorporate all or a portion of the functionality and supporting software and/or hardware circuitry to implement such functionality. Further, other computer architecture designs known in the art for processors and computing systems may also be used beyond the examples shown here. Generally, suitable computer architectures for embodiments disclosed herein can include, but are not limited to, configurations illustrated in FIGS. 9-15.

Figure 9:
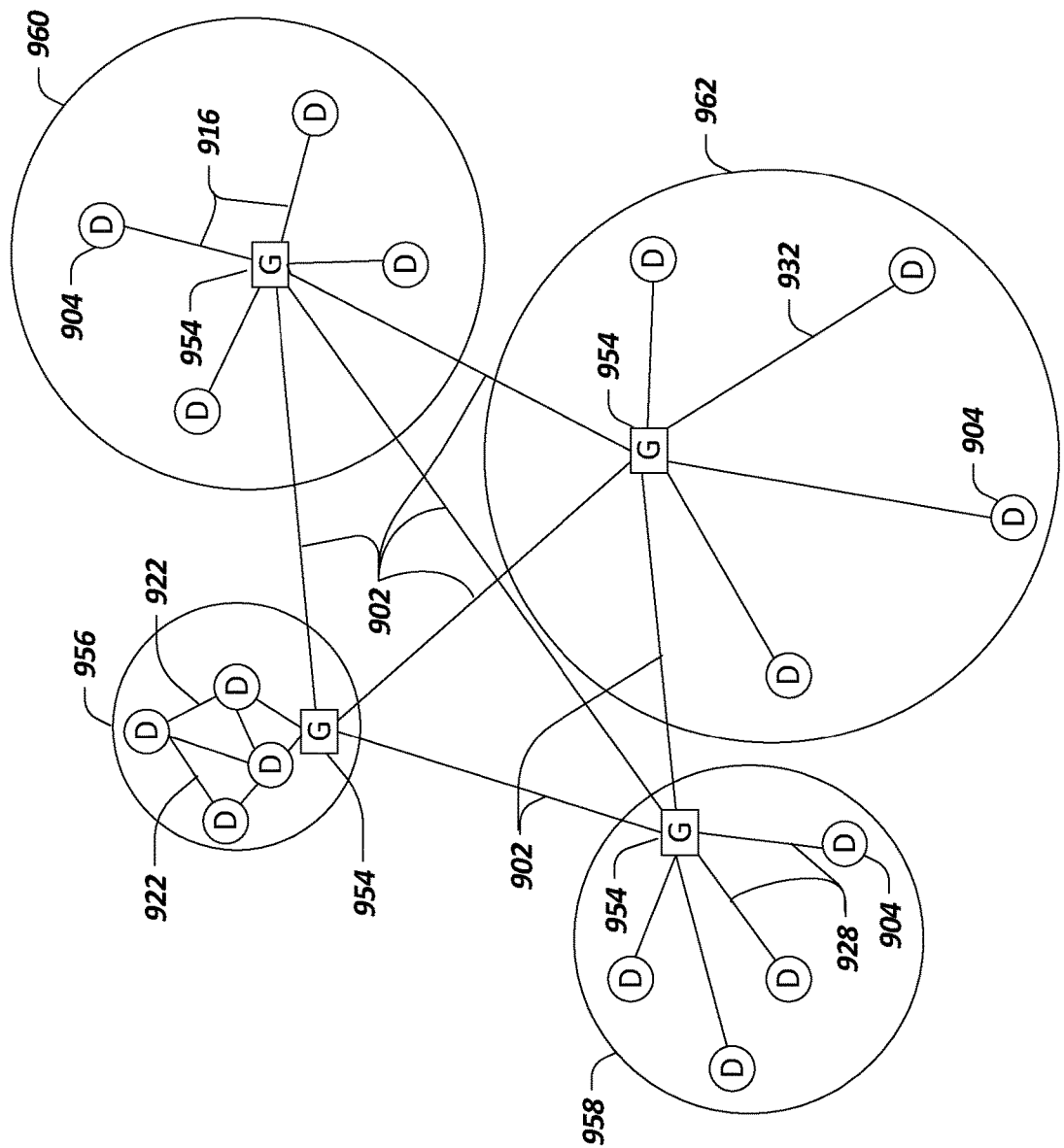
FIG. 9 is a simplified block diagram of an exemplary network with devices in accordance with at least some embodiments.

FIG. 9 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet. Such IoT devices may be equipped with logic and memory to implement and use hash tables, such as introduced above.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 10:
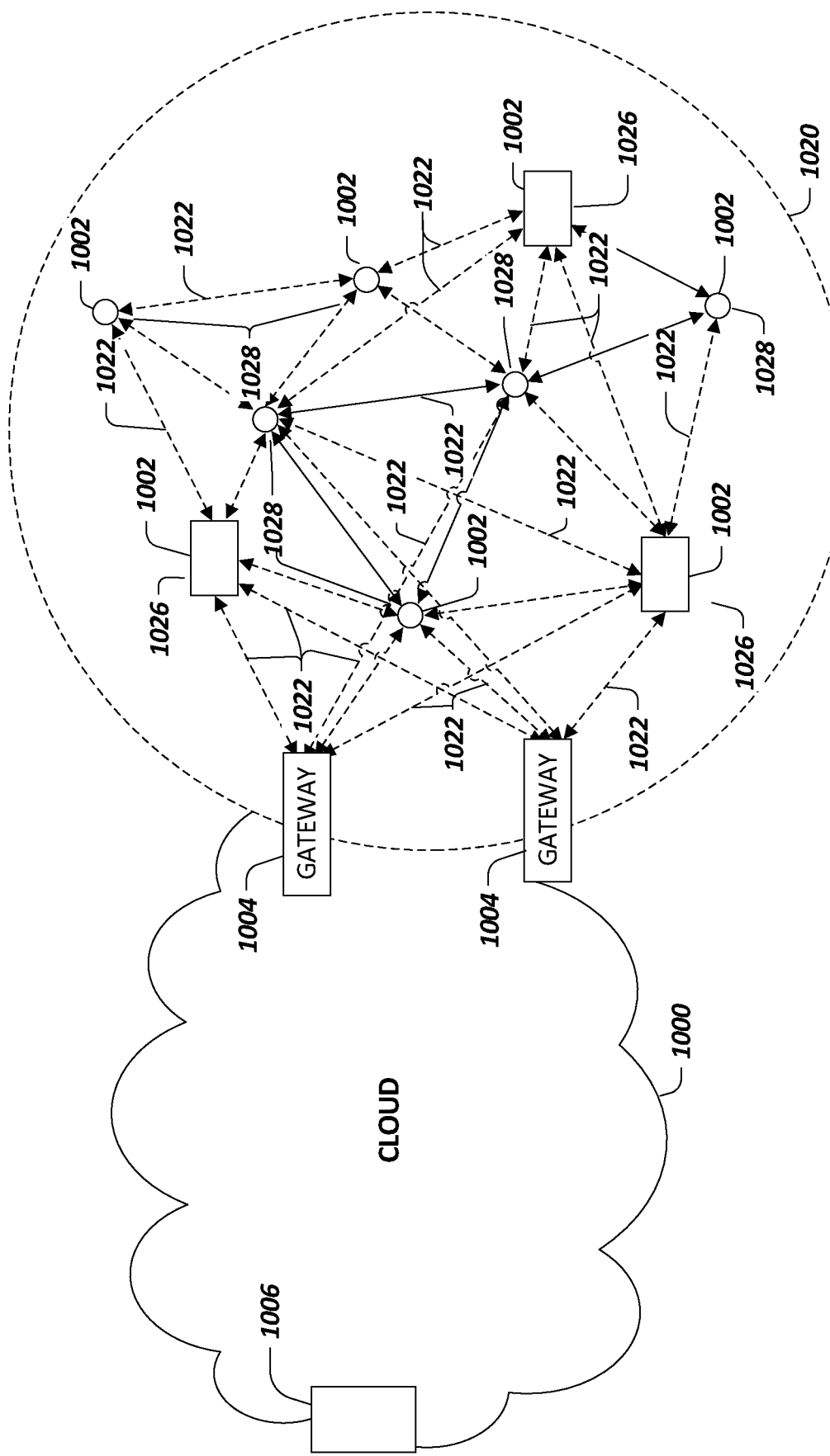
FIG. 10 is a simplified block diagram of an exemplary fog or cloud computing network in accordance with at least some embodiments.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QOS) terms specified in service level and service delivery agreements. As will be understood, the use of IoT devices and networks, such as those introduced in FIGS. 9 and 10, present a number of new challenges in a heterogeneous network of connectivity comprising a combination of wired and wireless technologies.

FIG. 9 specifically provides a simplified drawing of a domain topology that may be used for a number of internet-of-things (IoT) networks comprising IoT devices 904, with the IoT networks 956, 958, 960, 962, coupled through backbone links 902 to respective gateways 954. For example, a number of IoT devices 904 may communicate with a gateway 954, and with each other through the gateway 954. To simplify the drawing, not every IoT device 904, or communications link (e.g., link 916, 922, 928, or 932) is labeled. The backbone links 902 may include any number of wired or wireless technologies, including optical networks, and may be part of a local area network (LAN), a wide area network (WAN), or the Internet. Additionally, such communication links facilitate optical signal paths among both IoT devices 904 and gateways 954, including the use of MUXing/deMUXing components that facilitate interconnection of the various devices.

The network topology may include any number of types of IoT networks, such as a mesh network provided with the network 956 using Bluetooth® low energy (BLE) links 922. Other types of IoT networks that may be present include a wireless local area network (WLAN) network 958 used to communicate with IoT devices 904 through IEEE 802.11 (Wi-Fi®) links 928, a cellular network 960 used to communicate with IoT devices 904 through an LTE/LTE-A (4G) or 5G cellular network, and a low-power wide area (LPWA) network 962, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms a cluster tree of linked devices and networks.

Each of these IoT networks may provide opportunities for new technical features, such as those as described herein. The improved technologies and networks may enable the exponential growth of devices and networks, including the use of IoT networks, fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 904, such as over the backbone links 902, may be protected by a decentralized system for authentication, authorization, and accounting (AAA). In a decentralized AAA system, distributed payment, credit, audit, authorization, and authentication systems may be implemented across interconnected heterogeneous network infrastructures. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, and vibration, into the autonomous organizations among the IoT devices. The integration of sensory systems may allow systematic and autonomous communication and coordination of service delivery against contractual service objectives, orchestration and quality of service (Qos) based swarming and fusion of resources. Some of the individual examples of network-based resource processing include the following.

The mesh network 956, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource-based trust and service indices may be inserted to improve the data integrity, quality, and assurance and deliver a metric of data confidence.

The WLAN network 958, for instance, may use systems that perform standards conversion to provide multi-standard connectivity, enabling IoT devices 904 using different protocols to communicate. Further systems may provide seamless interconnectivity across a multi-standard infrastructure comprising visible Internet resources and hidden Internet resources.

Communications in the cellular network 960, for instance, may be enhanced by systems that offload data, extend communications to more remote devices, or both. The LPWA network 962 may include systems that perform non-Internet protocol (IP) to IP interconnections, addressing, and routing. Further, each of the IoT devices 904 may include the appropriate transceiver for wide area communications with that device. Further, each IoT device 904 may include other transceivers for communications using additional protocols and frequencies. This is discussed further with respect to the communication environment and hardware of an IoT processing device depicted, for instance, in FIGS. 12 and 13.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 10 below.

FIG. 10 illustrates a cloud computing network in communication with a mesh network of IoT devices (devices 1002) operating as a fog device at the edge of the cloud computing network. The mesh network of IoT devices may be termed a fog 1020, operating at the edge of the cloud 1000. To simplify the diagram, not every IoT device 1002 is labeled.

The fog 1020 may be considered to be a massively interconnected network wherein a number of IoT devices 1002 are in communications with each other, for example, by radio links 1022. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 1002 are shown in this example, gateways 1004, data aggregators 1026, and sensors 1028, although any combinations of IoT devices 1002 and functionality may be used. The gateways 1004 may be edge devices that provide communications between the cloud 1000 and the fog 1020, and may also provide the backend process function for data obtained from sensors 1028, such as motion data, flow data, temperature data, and the like. The data aggregators 1026 may collect data from any number of the sensors 1028, and perform the back-end processing function for the analysis. The results, raw data, or both may be passed along to the cloud 1000 through the gateways 1004. The sensors 1028 may be full IoT devices 1002, for example, capable of both collecting data and processing the data. In some cases, the sensors 1028 may be more limited in functionality, for example, collecting the data and allowing the data aggregators 1026 or gateways 1004 to process the data.

Communications from any IoT device 1002 may be passed along a convenient path (e.g., a most convenient path) between any of the IoT devices 1002 to reach the gateways 1004. In these networks, the number of interconnections provide substantial redundancy, allowing communications to be maintained, even with the loss of a number of IoT devices 1002. Further, the use of a mesh network may allow IoT devices 1002 that are very low power or located at a distance from infrastructure to be used, as the range to connect to another IoT device 1002 may be much less than the range to connect to the gateways 1004.

The fog 1020 provided from these IoT devices 1002 may be presented to devices in the cloud 1000, such as a server 1006, as a single device located at the edge of the cloud 1000, e.g., a fog device. In this example, the alerts coming from the fog device may be sent without being identified as coming from a specific IoT device 1002 within the fog 1020. In this fashion, the fog 1020 may be considered a distributed platform that provides computing and storage resources to perform processing or data-intensive tasks such as data analytics, data aggregation, and machine-learning, among others.

In some examples, the IoT devices 1002 may be configured using an imperative programming style, e.g., with each IoT device 1002 having a specific function and communication partners. However, the IoT devices 1002 forming the fog device may be configured in a declarative programming style, allowing the IoT devices 1002 to reconfigure their operations and communications, such as to determine needed resources in response to conditions, queries, and device failures. As an example, a query from a user located at a server 1006 about the operations of a subset of equipment monitored by the IoT devices 1002 may result in the fog 1020 device selecting the IoT devices 1002, such as particular sensors 1028, needed to answer the query. The data from these sensors 1028 may then be aggregated and analyzed by any combination of the sensors 1028, data aggregators 1026, or gateways 1004, before being sent on by the fog 1020 device to the server 1006 to answer the query. In this example, IoT devices 1002 in the fog 1020 may select the sensors 1028 used based on the query, such as adding data from flow sensors or temperature sensors. Further, if some of the IoT devices 1002 are not operational, other IoT devices 1002 in the fog 1020 device may provide analogous data, if available.

In other examples, the operations and functionality described above may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein. In some implementations, one or more multiple devices may operate cooperatively to implement functionality and perform tasks described herein. In some cases, one or more host devices may supply data, provide instructions, aggregate results, or otherwise facilitate joint operations and functionality provided by multiple devices. While functionality, when implemented by a single device, may be considered functionality local to the device, in implementations of multiple devices operating as a single machine, the functionality may be considered local to the devices collectively, and this collection of devices may provide or consume results provided by other, remote machines (implemented as a single device or collection devices), among other example implementations.

Figure 11:
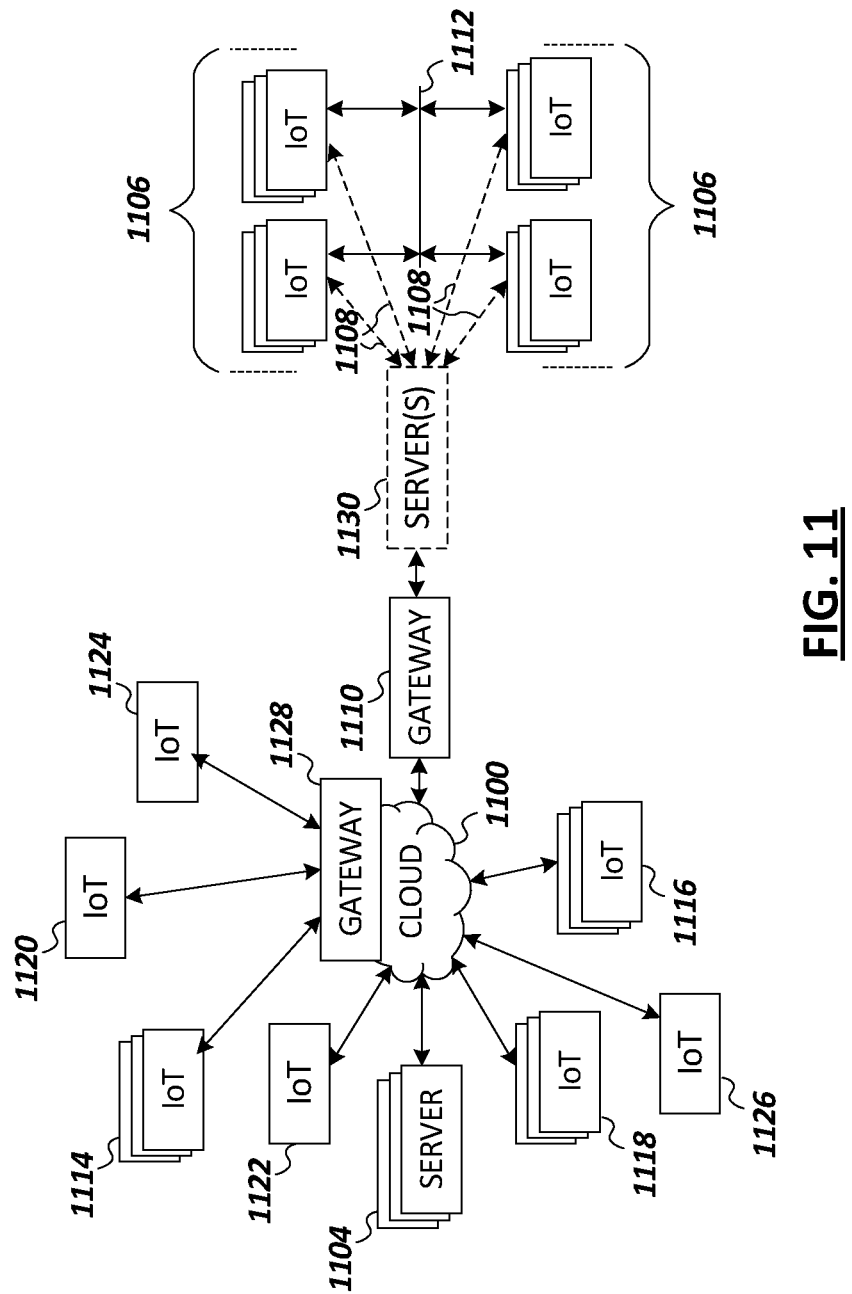
FIG. 11 is a simplified block diagram of a system including example devices in accordance with at least some embodiments.

For instance, FIG. 11 illustrates a drawing of a cloud computing network, or cloud 1100, in communication with a number of Internet of Things (IoT) devices. The cloud 1100 may represent the Internet, or may be a local area network (LAN), or a wide area network (WAN), such as a proprietary network for a company. The IoT devices may include any number of different types of devices, grouped in various combinations. For example, a traffic control group 1106 may include IoT devices along streets in a city. These IoT devices may include stoplights, traffic flow monitors, cameras, weather sensors, and the like. The traffic control group 1106, or other subgroups, may be in communication with the cloud 1100 through wired or wireless links 1108, such as LPWA links, optical links, and the like. Further, a wired or wireless sub-network 1112 may allow the IoT devices to communicate with each other, such as through a local area network, a wireless local area network, and the like. The IoT devices may use another device, such as a gateway 1110 or 1128 to communicate with remote locations such as the cloud 1100; the IoT devices may also use one or more servers 1130 to facilitate communication with the cloud 1100 or with the gateway 1110. For example, the one or more servers 1130 may operate as an intermediate network node to support a local edge cloud or fog implementation of a local area network. Further, the gateway 1128 that is depicted may operate in a cloud-to-gateway-to-many edge devices configuration, such as with the various IoT devices 1114, 1120, 1124 being constrained or dynamic to an assignment and use of resources in the cloud 1100.

Other example groups of IoT devices may include remote weather stations 1114, local information terminals 1116, alarm systems 1118, automated teller machines 1120, alarm panels 1122, or moving vehicles, such as emergency vehicles 1124 or other vehicles 1126, among many others. Each of these IoT devices may be in communication with other IoT devices, with servers 1104, with another IoT fog device or system (not shown, but depicted in FIG. 10), or a combination therein. The groups of IoT devices may be deployed in various residential, commercial, and industrial settings (including in both private or public environments).

As can be seen from FIG. 11, a large number of IoT devices may be communicating through the cloud 1100. This may allow different IoT devices to request or provide information to other devices autonomously. For example, a group of IoT devices (e.g., the traffic control group 1106) may request a current weather forecast from a group of remote weather stations 1114, which may provide the forecast without human intervention. Further, an emergency vehicle 1124 may be alerted by an automated teller machine 1120 that a burglary is in progress. As the emergency vehicle 1124 proceeds towards the automated teller machine 1120, it may access the traffic control group 1106 to request clearance to the location, for example, by lights turning red to block cross traffic at an intersection in sufficient time for the emergency vehicle 1124 to have unimpeded access to the intersection.

Clusters of IoT devices, such as the remote weather stations 1114 or the traffic control group 1106, may be equipped to communicate with other IoT devices as well as with the cloud 1100. This may allow the IoT devices to form an ad-hoc network between the devices, allowing them to function as a single device, which may be termed a fog device or system (e.g., as described above with reference to FIG. 10).

Figure 12:
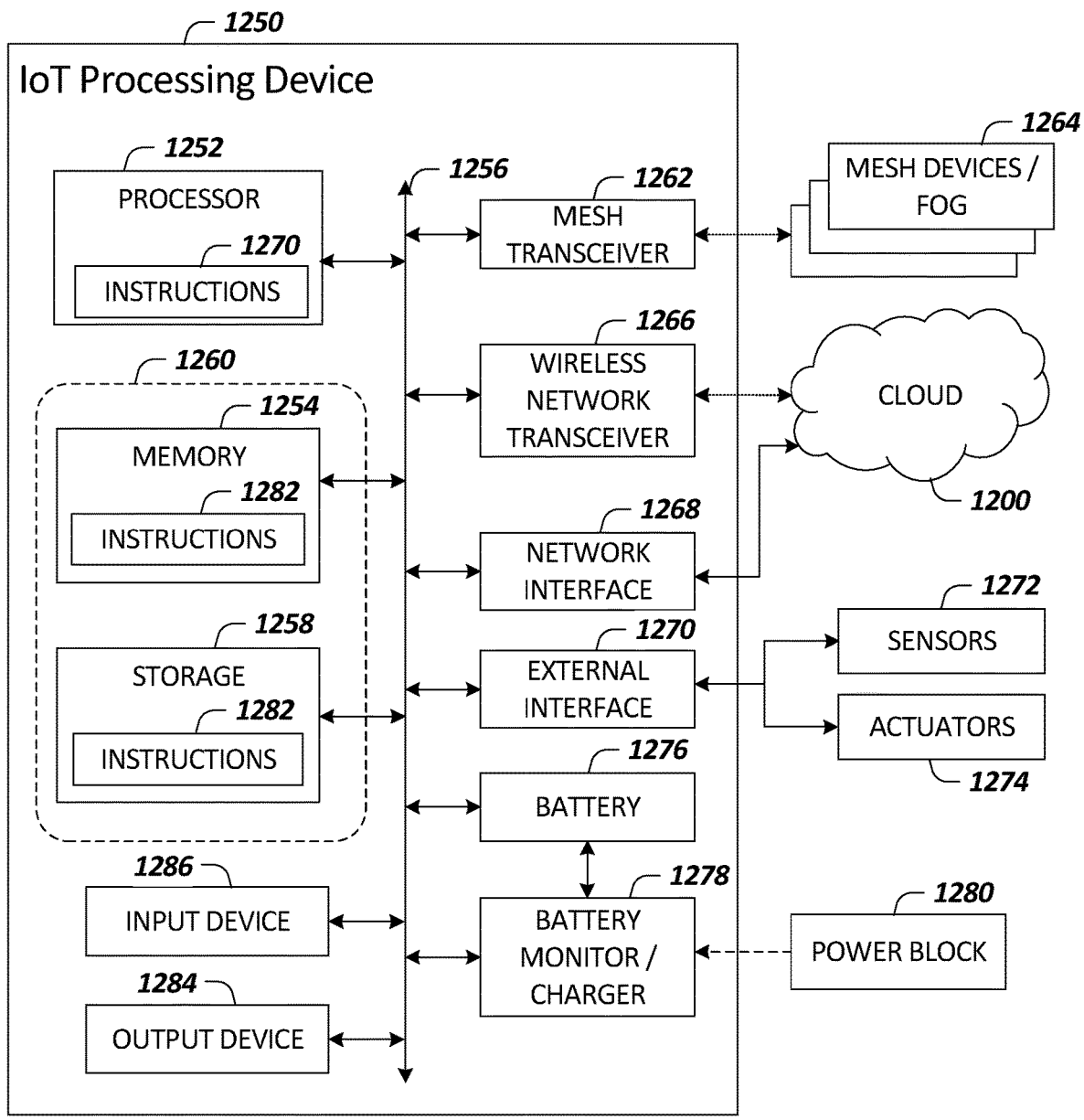
FIG. 12 is a simplified block diagram of an example processing device in accordance with at least some embodiments.

FIG. 12 is a block diagram of an example of components that may be present in an IoT device 1250 for implementing the techniques described herein. The IoT device 1250 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1250, or as components otherwise incorporated within a chassis of a larger system. Additionally, the block diagram of FIG. 12 is intended to depict a high-level view of components of the IoT device 1250. However, some of the components shown may be omitted, additional components may be present, and different arrangements of the components shown may occur in other implementations.

The IoT device 1250 may include a processor 1252, which may be a microprocessor, a multi-core processor, a multithreaded processor, an ultra-low voltage processor, an embedded processor, or other known processing element. The processor 1252 may be a part of a system on a chip (SoC) in which the processor 1252 and other components are formed into a single integrated circuit, or a single package, such as the Edison™ or Galileo™ SoC boards from Intel®. As an example, the processor 1252 may include an Intel® Architecture Core™ based processor, such as a Quark™, an Atom™, an i3, an i5, an i7, or an MCU-class processor, or another such processor available from Intel® Corporation, Santa Clara, Calif. However, any number of other processors may be used, such as available from Advanced Micro Devices®, Inc. (AMD®) of Sunnyvale, Calif., a MIPS®-based design from MIPS® Technologies, Inc. of Sunnyvale, Calif., an ARM®-based design licensed from ARM® Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments®, Inc.

The processor 1252 may communicate with a system memory 1254 over an interconnect 1256 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1258 may also couple to the processor 1252 via the interconnect 1256. In an example the storage 1258 may be implemented via a solid-state disk drive (SSDD). Other devices that may be used for the storage 1258 include flash memory cards, such as SD cards, microSD cards, xD picture cards, and the like, and USB flash drives. In low power implementations, the storage 1258 may be on-die memory or registers associated with the processor 1252. However, in some examples, the storage 1258 may be implemented using a micro hard disk drive (HDD). Further, any number of new technologies may be used for the storage 1258 in addition to, or instead of, the technologies described, such as resistance change memories, phase change memories, holographic memories, or chemical memories, among others.

The components may communicate over the interconnect 1256. The interconnect 1256 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1256 may be a proprietary bus, for example, used in a SoC based system. Other bus systems may be included, such as an I2C interface, an SPI interface, point to point interfaces, and a power bus, among others.

The interconnect 1256 may couple the processor 1252 to a mesh transceiver 1262, for communications with other mesh devices 1264. The mesh transceiver 1262 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1264. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1262 may communicate using multiple standards or radios for communications at different ranges. For example, the IoT device 1250 may communicate with close devices, e.g., within about 10 meters, using a local transceiver based on BLE, or another low power radio, to save power. More distant mesh devices 1264, e.g., within about 50 meters, may be reached over ZigBee? or other intermediate power radios. Both communications techniques may take place over a single radio at different power levels, or may take place over separate transceivers, for example, a local transceiver using BLE and a separate mesh transceiver using ZigBee®.

A wireless network transceiver 1266 may be included to communicate with devices or services in the cloud 1200 via local or wide area network protocols. The wireless network transceiver 1266 may be a LPWA transceiver that follows the IEEE 802.15.4, or IEEE 802.15.4g standards, among others. The IoT device 1250 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1262 and wireless network transceiver 1266, as described herein. For example, the radio transceivers 1262 and 1266 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1262 and 1266 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication system, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1266, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1268 may be included to provide a wired communication to the cloud 1200 or to other devices, such as the mesh devices 1264. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1268 may be included to allow connection to a second network, for example, a NIC 1268 providing communications to the cloud over Ethernet, and a second NIC 1268 providing communications to other devices over another type of network.

The interconnect 1256 may couple the processor 1252 to an external interface 1270 that is used to connect external devices or subsystems. The external devices may include sensors 1272, such as accelerometers, level sensors, flow sensors, optical light sensors, camera sensors, temperature sensors, global positioning system (GPS) sensors, pressure sensors, barometric pressure sensors, and the like. The external interface 1270 further may be used to connect the IoT device 1250 to actuators 1274, such as power switches, valve actuators, an audible sound generator, a visual warning device, and the like.

In some optional examples, various input/output (I/O) devices may be present within, or connected to, the IoT device 1250. For example, a display or other output device 1284 may be included to show information, such as sensor readings or actuator position. An input device 1286, such as a touch screen or keypad, may be included to accept input. An output device 1284 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1250.

A battery 1276 may power the IoT device 1250, although in examples in which the IoT device 1250 is mounted in a fixed location, it may have a power supply coupled to an electrical grid. The battery 1276 may be a lithium ion battery, or a metal-air battery, such as a zinc-air battery, an aluminum-air battery, a lithium-air battery, and the like.

A battery monitor/charger 1278 may be included in the IoT device 1250 to track the state of charge (SoCh) of the battery 1276. The battery monitor/charger 1278 may be used to monitor other parameters of the battery 1276 to provide failure predictions, such as the state of health (SoH) and the state of function (SoF) of the battery 1276. The battery monitor/charger 1278 may include a battery monitoring integrated circuit, such as an LTC4020 or an LTC2990 from Linear Technologies®, an ADT7488A from ON Semiconductor® of Phoenix Ariz., or an IC from the UCD90xxx family from Texas Instruments® of Dallas, Tex. The battery monitor/charger 1278 may communicate the information on the battery 1276 to the processor 1252 over the interconnect 1256. The battery monitor/charger 1278 may also include an analog-to-digital (ADC) convertor that allows the processor 1252 to directly monitor the voltage of the battery 1276 or the current flow from the battery 1276. The battery parameters may be used to determine actions that the IoT device 1250 may perform, such as transmission frequency, mesh network operation, sensing frequency, and the like.

A power block 1280, or other power supply coupled to a grid, may be coupled with the battery monitor/charger 1278 to charge the battery 1276. In some examples, the power block 1280 may be replaced with a wireless power receiver to obtain the power wirelessly, for example, through a loop antenna in the IoT device 1250. A wireless battery charging circuit, such as an LTC4020 chip from Linear Technologies@ of Milpitas, Calif., among others, may be included in the battery monitor/charger 1278. The specific charging circuits chosen depend on the size of the battery 1276, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1258 may include instructions 1282 in the form of software, firmware, or hardware commands to implement the techniques described herein. Although such instructions 1282 are shown as code blocks included in the memory 1254 and the storage 1258, it may be understood that any of the code blocks may be replaced with hardwired circuits, for example, built into an application specific integrated circuit (ASIC).

In an example, the instructions 1282 provided via the memory 1254, the storage 1258, or the processor 1252 may be embodied as a non-transitory, machine readable medium 1260 including code to direct the processor 1252 to perform electronic operations in the IoT device 1250. The processor 1252 may access the non-transitory, machine readable medium 1260 over the interconnect 1256. For instance, the non-transitory, machine readable medium 1260 may be embodied by devices described for the storage 1258 of FIG. 12 or may include specific storage units such as optical disks, flash drives, or any number of other hardware devices. The non-transitory, machine readable medium 1260 may include instructions to direct the processor 1252 to perform a specific sequence or flow of actions, for example, as described with respect to the flowchart(s) and block diagram(s) of operations and functionality depicted above.

Figure 13:
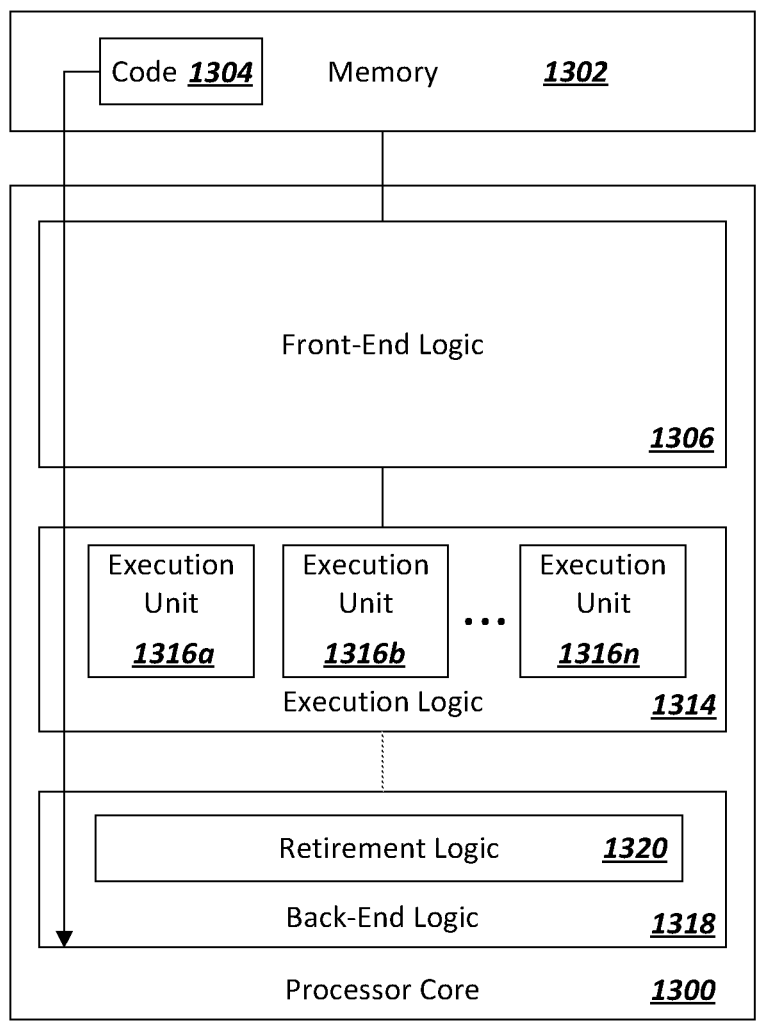
FIG. 13 is a block diagram of an exemplary processor in accordance with at least some embodiments.

FIG. 13 is an example illustration of a processor according to an embodiment. Processor 1300 is an example of a type of hardware device that can be used in connection with the implementations above. Processor 1300 may be any type of processor, such as a microprocessor, an embedded processor, a digital signal processor (DSP), a network processor, a multi-core processor, a single core processor, or other device to execute code. Although only one processor 1300 is illustrated in FIG. 13, a processing element may alternatively include more than one of processor 1300 illustrated in FIG. 13. Processor 1300 may be a single-threaded core or, for at least one embodiment, the processor 1300 may be multi-threaded in that it may include more than one hardware thread context (or "logical processor") per core.

FIG. 13 also illustrates a memory 1302 coupled to processor 1300 in accordance with an embodiment. Memory 1302 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1300 can execute any type of instructions associated with algorithms, processes, or operations detailed herein. Generally, processor 1300 can transform an element or an article (e.g., data) from one state or thing to another state or thing.

Code 1304, which may be one or more instructions to be executed by processor 1300, may be stored in memory 1302, or may be stored in software, hardware, firmware, or any suitable combination thereof, or in any other internal or external component, device, element, or object where appropriate and based on particular needs. In one example, processor 1300 can follow a program sequence of instructions indicated by code 1304. Each instruction enters a front-end logic 1306 and is processed by one or more decoders. The decoder may generate, as its output, a micro operation such as a fixed width micro operation in a predefined format, or may generate other instructions, microinstructions, or control signals that reflect the original code instruction. Front-end logic 1306 also includes register renaming logic and scheduling logic, which generally allocate resources and queue the operation corresponding to the instruction for execution.

Processor 1300 can also include execution logic 1314 having a set of execution units 1316a, 1316b, 1316n, etc. Some embodiments may include a number of execution units dedicated to specific functions or sets of functions. Other embodiments may include only one execution unit or one execution unit that can perform a particular function. Execution logic 1314 performs the operations specified by code instructions.

After completion of execution of the operations specified by the code instructions, back-end logic 1318 can retire the instructions of code 1304. In one embodiment, processor 1300 allows out of order execution but requires in order retirement of instructions. Retirement logic 1320 may take a variety of known forms (e.g., re-order buffers or the like). In this manner, processor 1300 is transformed during execution of code 1304, at least in terms of the output generated by the decoder, hardware registers and tables utilized by register renaming logic 1310, and any registers (not shown) modified by execution logic 1314.

Although not shown in FIG. 13, a processing element may include other elements on a chip with processor 1300. For example, a processing element may include memory control logic along with processor 1300. The processing element may include I/O control logic and/or may include I/O control logic integrated with memory control logic. The processing element may also include one or more caches. In some embodiments, non-volatile memory (such as flash memory or fuses) may also be included on the chip with processor 1300.

Figure 14:
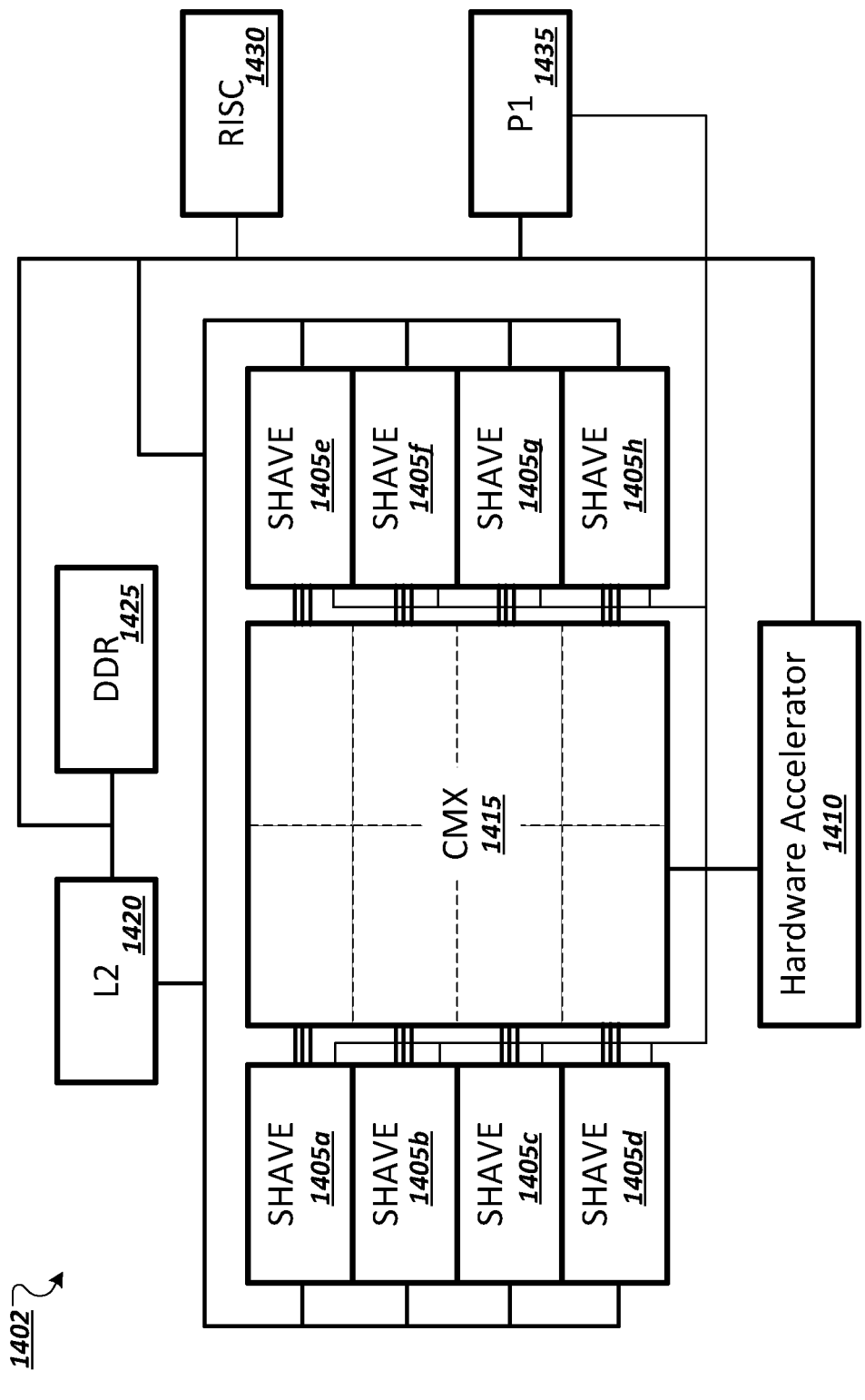
FIG. 14 is a simplified block diagram of an example machine learning device in accordance with some embodiments.

FIG. 14 is a simplified block diagram 1400 of an example machine learning processing device 1402, in accordance with some example implementations. In this particular example, a machine learning device 1402 may implement a VPU that includes a set of special-purpose processors 1405a-h, a machine learning accelerator 1410, and non-standard memory hierarchy 1415, and multiple types of memory (e.g., 1420, 1425). For instance, multiple processors 1405a-h (e.g., Streaming Hybrid Architecture Vector Engine (SHAVE) processors) may share a multiport memory subsystem 1415 in accordance with some embodiments. Such processors 1405a-h may be implemented as proprietary or special-purpose processors with very long instruction word (VLIW) instruction sets, among other examples. The memory subsystem 1415 may be implemented as a collection of memory slices, referred to herein as "connection matrix" (CMX) slices. CMX memory 1415 may be implemented as fast, local memory (e.g., SDRAM) and can embody scratchpad memory usable by individual processors (e.g., 1405a-h). Layer 2 (L2) cache 1420 and DDR memory 1425 may be further provided as more general-purpose, or system, memory, in this example. Further an example machine learning processing device may further include a reduced instruction set computer (RISC) element 1430, as well as other processor devices (e.g., 1435).

One or more hardware accelerator devices (e.g., 1410) may be included in or coupled to the machine learning processing device. Such accelerator devices may be fixed-function hardware accelerators configured particularly to support matrix arithmetic, particular machine learning operations, or other specialized functions to enhance the overall capabilities of the machine learning processing device 1402. In one example, the accelerator device may itself include a number of data processing units (DPUs), which may connect to and also make use of the memory subsystem 1415, among other example features and components. In the example of FIG. 14, example memory subsystem 1415 may include or define specific memory regions where specific tensor types are required to reside (e.g., populated, unpopulated, network input and output tensors).

In some implementations, each SHAVE processor (e.g., 1405 a-h) can include two load store units by which data may be loaded from and stored to CMX slices of the memory subsystem memory 1415. Each memory slice may be associated with a corresponding SHAVE processor (e.g., 1405 a-h). Further, each SHAVE processor (e.g., 1405 a-h) can also include an instruction unit into which instructions may be loaded. In a particular embodiment in which the processor includes a SHAVE, the SHAVE can include one or more of a reduced instruction set computer (RISC), a digital signal processor (DSP), a very long instruction word (VLIW), and/or a graphics processing unit (GPU). An example machine learning processing device may additionally include an interconnection system that couples the processors 1405 a-h and the memory slices of memory 1415. The interconnection system may be referred to as an inter-shave interconnect (ISI). The ISI can include a bus through which processors (e.g., 1405 a-h) can read or write data to any part of any one of the memory slices of memory 1415, among other example communications and transactions.

Figure 15:
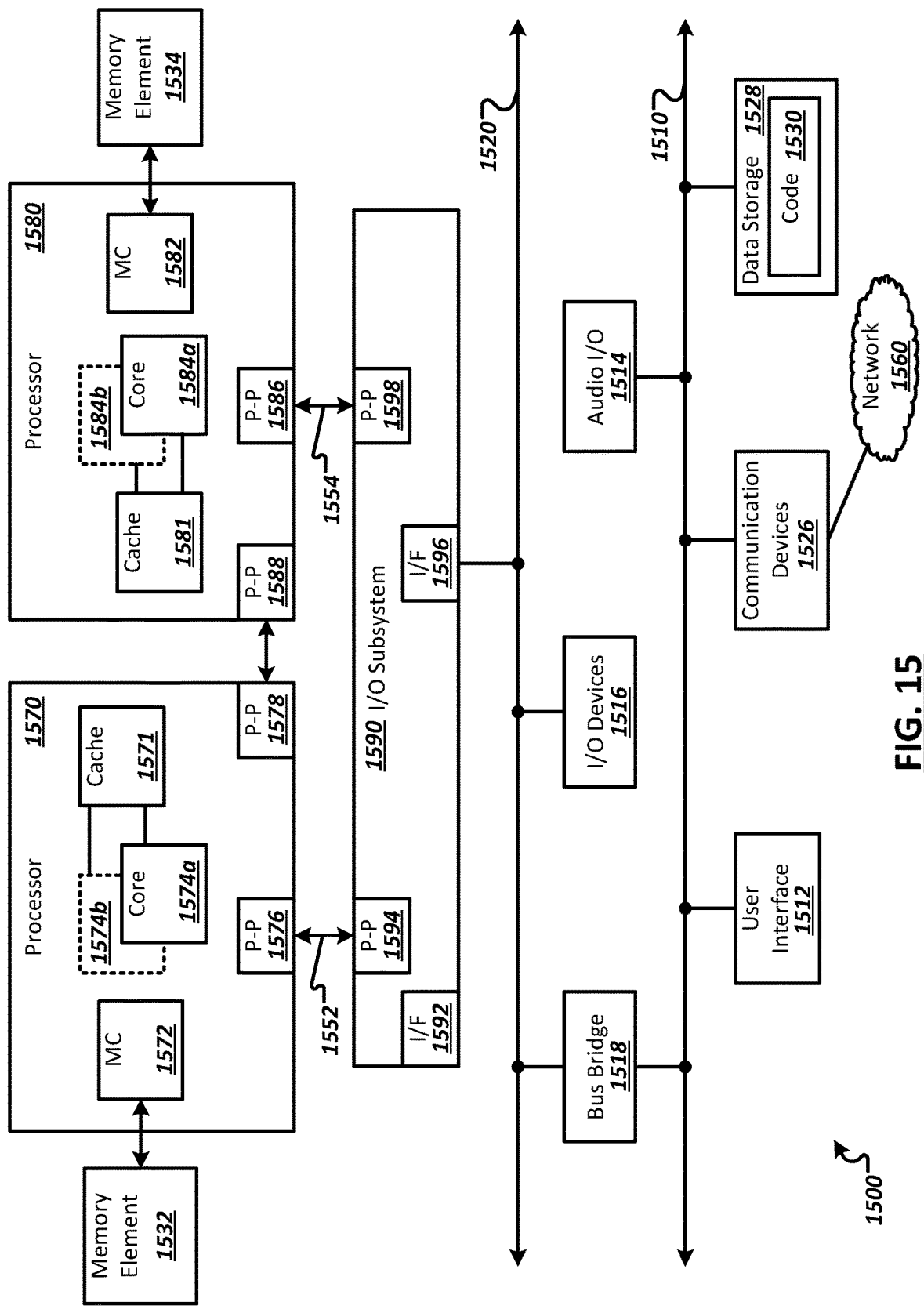
FIG. 15 is a block diagram of an exemplary computing system in accordance with at least some embodiments.

FIG. 15 illustrates a computing system 1500 that is arranged in a point-to-point (PtP) configuration according to an embodiment. In particular, FIG. 15 shows a system where processors, memory, and input/output devices are interconnected by a number of point-to-point interfaces. Generally, one or more of the computing systems described herein may be configured in the same or similar manner as computing system 1500.

Processor 1570 includes a cache 1571 and cores 1574*a* and 1574*b*. Processor 1580 includes a cache 1581 and cores 1584*a* and 1584*b*. Processors 1570 and 1580 may also each include integrated memory controller logic (MC) 1572 and 1582 to communicate with memory elements 1532 and 1534. In alternative embodiments, memory controller logic 1572 and 1582 may be discrete logic separate from processors 1570 and 1580. Memory elements 1532 and/or 1534 may store various data to be used by processors 1570 and 1580 in achieving operations and functionality outlined herein.

Processors 1570 and 1580 may be any type of processor, such as those discussed in connection with other figures. Processors 1570 and 1580 may exchange data via a point-to-point (PtP) interface using point-to-point interface circuits 1578 and 1588, respectively. Processors 1570 and 1580 may each exchange data with a chipset 1590 via individual point-to-point interfaces 1552 and 1554 using point-to-point interface circuits 1576, 1586, 1594, and 1598. Chipset 1590 may also exchange data with a high-performance graphics circuit via a high-performance graphics interface, using an interface circuit 1592, which could be a PtP interface circuit. In alternative embodiments, any or all of the PtP links illustrated in FIG. 15 could be implemented as a multi-drop bus rather than a PtP link.

Chipset 1590 may be in communication with a bus 1520 via an interface circuit 1596. Bus 1520 may have one or more devices that communicate over it, such as a bus bridge 1518 and I/O devices 1516. Via a bus 1510, bus bridge 1518 may be in communication with other devices such as a user interface 1512 (such as a keyboard, mouse, touchscreen, or other input devices), communication devices 1526 (such as modems, network interface devices, or other types of communication devices that may communicate through a computer network 1560), audio I/O devices 1514, and/or a data storage device 1528. Data storage device 1528 may store code 1530, which may be executed by processors 1570 and/or 1580. In alternative embodiments, any portions of the bus architectures could be implemented with one or more PtP links.

The computer system depicted in FIG. 15 is a schematic illustration of an embodiment of a computing system that may be utilized to implement various embodiments discussed herein. It will be appreciated that various components of the system depicted in FIG. 15 may be combined in a system-on-a-chip (SoC) architecture or in any other suitable configuration capable of achieving the functionality and features of examples and implementations provided herein.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. Example 1 is a non-transitory machine-readable storage medium with instructions stored thereon, where the instructions are executable by a machine to cause the machine to: identify definitions of a plurality of different parent neural network models; identify, from grammar definition data, a grammar to be used in a grammatical evolution, where the grammar defines rules to automatically build a valid neural network model; perform a grammatical evolution of the plurality of parent neural network models based on the grammar to generate a set of child neural network models; cause a test of a generation of neural network models to be performed based on a set of test data to be input to the generation of neural network models, where the generation of neural network models includes the set of child neural network models; determine an attribute value set for each one of the neural network models in the generation based on the test, where each attribute value set identifies a respective value for each one of a plurality of different attributes for the corresponding neural network model, and at least one of the plurality of different attributes includes validation accuracy determined from the test; determine a non-dominated front within the attribute value sets determined for the generation of neural network models; and select a subset of the generation of neural network models based on the non-dominated front.

Example 2 includes the subject matter of example 1, where the instructions are further executable to cause the machine to cause the set of child neural network models to be trained using a set of training data, where the test is to be performed after training of the set of child neural network models.

Example 3 includes the subject matter of example 2, where the set of training data set includes a first subset of a data set and the test data set includes a second subset of the data set.

Example 4 includes the subject matter of example 3, where the data set includes a set of images.

Example 5 includes the subject matter of any one of examples 1-4, where the grammar defines rules to build a valid neural network model based on a set of network modules, and the set of child neural networks are each built using the set of network modules.

Example 6 includes the subject matter of example 5, where building a neural network model from the set of network modules includes: selecting a combination of network modules in the set of network modules for inclusion in the respective neural network model based on the grammar; and setting respective parameter values for each network module selected for inclusion in the respective child neural network based on the grammar.

Example 7 includes the subject matter of any one of examples 5-6, where at least a subset of the plurality of parent neural network models are built from the set of network modules based on the grammar.

Example 8 includes the subject matter of any one of examples 5-7, where the set of network modules includes a plurality of network modules, and each one of the plurality of network modules includes a different respective type of network portion.

Example 9 includes the subject matter of example 8, where the types of network portions include respective sets of neural network layers.

Example 10 includes the subject matter of any one of examples 8-9, where the plurality of network modules includes a convolution network module and an inception network module.

Example 11 includes the subject matter of any one of examples 5-10, where network modules in the neural networks are connected to at least one of fully-connected layers or max-pooling layers based on the grammar to generate a respective neural network model.

Example 12 includes the subject matter of any one of examples 1-11, where the generation of neural network models further includes the parent neural network models.

Example 13 includes the subject matter of any one of examples 1-12, where performing the grammatical evolution includes performing variation operations on parameter values of each one of the parent neural network models.

Example 14 includes the subject matter of example 13, where the variation operations include at least one of a mutation operation or a crossover operation.

Example 15 includes the subject matter of any one of examples 13-14, where the variation operations include structural mutation based on one or more of the number of layers, the number of kernels, or size of filters in the respective parent neural network model.

Example 16 includes the subject matter of example 15, where the variation operations further include learning parameter mutation of the parent neural network model based on one or more of learning rate, batch size, weight decay, momentum, optimizer used, and dropout rate.

Example 17 includes the subject matter of any one of examples 1-16, where selection of the subset of the generation of neural network models is based on results of a random binary tournament based on the attribute value sets.

Example 18 includes the subject matter of example 17, where the results of the random binary tournament are based on a rank value and crowding distance within the attribute value sets.

Example 19 includes the subject matter of any one of examples 1-18, where the neural network models include convolutional neural network (CNN) models.

Example 20 includes the subject matter of any one of examples 1-19, where multiple evolutions are to be performed over multiple generations of neural network models based on the grammar, a next generation of neural network models is to be based on a respective non-dominated front determined from values obtained through testing of an immediately preceding generation of neural network models.

Example 21 is a method including: identifying definitions of a first plurality of different parent neural network models; identifying, from grammar definition data, a grammar to be used in a grammatical evolution, where the grammar defines rules to automatically build a valid neural network model; performing a grammatical evolution of the first plurality of parent neural network models based on the grammar to generate a first set of child neural network models; performing a test of a generation of neural network models to be performed based on a set of test data to be input to the generation of neural network models, where the generation of neural network models includes the first set of child neural network models; determining, for each neural network model in the generation of neural network models, respective values for each one of a plurality of attributes, where at least one of the plurality of attributes includes a validation accuracy value determined from the test; performing a multi-objective optimization based on the values of the plurality of attributes for the generation of neural networks, where the multi-objective optimization determines at least one non-dominated front associated with the generation of neural network models; and select a subset of the generation of neural network models based on the non-dominated front.

Example 22 includes the subject matter of example 21, further including: designating the subset of the generation of neural network models as a second plurality of parent neural network models for a next generation of neural network models; performing a grammatical evolution of the second plurality of parent neural network models based on the grammar to generate a second set of child neural network models to be included in the next generation of neural network models; and testing the next generation of neural network models to determine values for the plurality of attributes.

Example 23 includes the subject matter of example 21, where the generation of neural network models includes a final generation in a plurality of generations of neural network models generated through grammatical evolution based on the grammar, and the subset of the generation of neural network models includes a final set of neural network models for adoption.

Example 24 includes the subject matter of any one of examples 21-23, further including training the first set of child neural network models to be trained using a set of training data, where the test is to be performed after training of the first set of child neural network models.

Example 25 includes the subject matter of any one of examples 21-24, where the grammar defines rules to build a valid neural network model based on a set of network modules, and the first set of child neural networks are each built using the set of network modules.

Example 26 includes the subject matter of example 25, where building a neural network model from the set of network modules includes: selecting a combination of network modules in the set of network modules for inclusion in the respective neural network model based on the grammar; and setting respective parameter values for each network module selected for inclusion in the respective child neural network based on the grammar.

Example 27 includes the subject matter of any one of examples 25-26, where at least a subset of the first plurality of parent neural network models are built from the set of network modules based on the grammar.

Example 28 includes the subject matter of any one of examples 25-27, where the set of network modules includes a plurality of network modules, and each one of the plurality of network modules includes a different respective type of network portion.

Example 29 includes the subject matter of example 28, where the types of network portions include respective sets of neural network layers.

Example 30 includes the subject matter of any one of examples 28-29, where the plurality of network modules includes a convolution network module and an inception network module.

Example 31 includes the subject matter of any one of examples 25-30, where network modules in the neural networks are connected to at least one of fully-connected layers or max-pooling layers based on the grammar to generate a respective neural network model.

Example 32 includes the subject matter of any one of examples 21-31, where the generation of neural network models further includes the first plurality of parent neural network models.

Example 33 includes the subject matter of any one of examples 21-32, where performing the grammatical evolution includes performing variation operations on parameter values of each one of the parent neural network models.

Example 34 includes the subject matter of example 33, where the variation operations include structural mutation based on one or more of the number of layers, the number of kernels, or size of filters in the respective parent neural network model.

Example 35 includes the subject matter of example 34, where the variation operations further include learning parameter mutation of the parent neural network model based on one or more of learning rate, batch size, weight decay, momentum, optimizer used, and dropout rate.

Example 36 includes the subject matter of any one of examples 21-35, where selecting the subset of the generation of neural network models is based on results of a random binary tournament based on the attribute value sets.

Example 37 includes the subject matter of example 36, where the results of the random binary tournament are based on a rank value and crowding distance within the attribute value sets.

Example 38 is a system including means to perform the method of any one of examples 21-37.

Example 39 is a system including: at least one data processor; at least one memory element; and a neural network generator, executable by the data processor to: identify definitions of a plurality of different parent neural network models; identify, from grammar definition data, a grammar to be used in a grammatical evolution, where the grammar defines rules to automatically build a valid neural network model; and perform a grammatical evolution of the plurality of parent neural network models based on the grammar to generate a set of child neural network models;

a testing system, executable by the data processor to: perform a test of a generation of neural network models based on a set of test data to be input to the generation of neural network models, where the generation of neural network models includes the set of child neural network models; and determine an attribute value set for each one of the neural network models in the generation based on the test, where each attribute value set identifies respective values for a plurality of different attributes for the corresponding neural network model, and at least one of the plurality of different attributes includes validation accuracy determined from the test; and a multi-objective optimizer, executable by the data processor to: determine a non-dominated front within the attribute value sets determined for the generation of neural network models; and select a subset of the generation of neural network models based on the non-dominated front.

Example 40 includes the subject matter of example 39, where the instructions are further executable to cause the machine to cause the set of child neural network models to be trained using a set of training data, where the test is to be performed after training of the set of child neural network models.

Example 41 includes the subject matter of example 40, where the set of training data includes a first subset of a data set and the test data includes a second subset of the data set.

Example 42 includes the subject matter of example 41, where the data set includes a set of images.

Example 43 includes the subject matter of any one of examples 39-42, where the grammar defines rules to build a valid neural network model based on a set of network modules, and the set of child neural networks are each built using the set of network modules.

Example 44 includes the subject matter of example 43, where building a neural network model from the set of network modules includes: selecting a combination of network modules in the set of network modules for inclusion in the respective neural network model based on the grammar; and setting respective parameter values for each network module selected for inclusion in the respective child neural network based on the grammar.

Example 45 includes the subject matter of any one of examples 43-44, where at least a subset of the plurality of parent neural network models are built from the set of network modules based on the grammar.

Example 46 includes the subject matter of any one of examples 43-45, where the set of network modules includes a plurality of network modules, and each one of the plurality of network modules includes a different respective type of network portion.

Example 47 includes the subject matter of example 46, where the types of network portions include respective sets of neural network layers.

Example 48 includes the subject matter of any one of examples 46-47, where the plurality of network modules includes a convolution network module and an inception network module.

Example 49 includes the subject matter of any one of examples 43-48, where network modules in the neural networks are connected to at least one of fully-connected layers or max-pooling layers based on the grammar to generate a respective neural network model.

Example 50 includes the subject matter of any one of examples 39-49, where the generation of neural network models further includes the parent neural network models.

Example 51 includes the subject matter of any one of examples 39-50, where performing the grammatical evolution includes performing variation operations on parameter values of each one of the parent neural network models.

Example 52 includes the subject matter of example 51, where the variation operations include at least one of a mutation operation or a crossover operation.

Example 53 includes the subject matter of any one of examples 51-52, where the variation operations include structural mutation based on one or more of the number of layers, the number of kernels, or size of filters in the respective parent neural network model.

Example 54 includes the subject matter of example 53, where the variation operations further include learning parameter mutation of the parent neural network model based on one or more of learning rate, batch size, weight decay, momentum, optimizer used, and dropout rate.

Example 55 includes the subject matter of any one of examples 39-54, where selection of the subset of the generation of neural network models is based on results of a random binary tournament based on the attribute value sets.

Example 56 includes the subject matter of example 55, where the results of the random binary tournament are based on a rank value and crowding distance within the attribute value sets.

Example 57 includes the subject matter of any one of examples 39-56, where the neural network models include convolutional neural network (CNN) models.

Example 58 includes the subject matter of any one of examples 39-57, where multiple evolutions are to be performed over multiple generations of neural network models based on the grammar, a next generation of neural network models is to be based on a respective non-dominated front determined from values obtained through testing of an immediately preceding generation of neural network models.

Example 59 includes the subject matter of example 58, where a final set of neural network models is to be generated from the multiple evolutions for consumption by a computing system of a machine.

Example 60 includes the subject matter of example 59, where the machine includes one of a drone, robot, sensor device, or autonomous vehicle.

Example 61 is a method including: receiving input data including a definition of a plurality of different parent neural networks, where each of the plurality of parent neural networks are constructed using respective network modules defined in a set of network modules; performing iterations of a grammatical evolution algorithm to generate generations of children neural networks from the plurality of parent neural networks; providing a dataset as an input to each of the children neural networks; determining a respective accuracy of each one of the children neural networks from a respective output generated in response to the input; and determining a Pareto front for each generation of children neural networks, where the Pareto front is to optimize a tradeoff between size of a child neural network and the determined accuracy of the child neural network.

Example 62 includes the subject matter of example 61, further including determining an optimized one of the child neural networks based on one or more of the Pareto fronts.

Example 63 includes the subject matter of any one of examples 61-62, where the set of network modules includes a set of convolution blocks and a set of inception blocks.

Example 64 includes the subject matter of example 63, where network modules in the neural networks are connected to at least one of fully-connected layers or max-pooling layers.

Example 65 includes the subject matter of any one of examples 61-64, where the children neural networks are to be generated using modules in the set of network modules.

Example 66 includes the subject matter of any one of examples 61-65, where top performing neural networks in each generation are preserved for inclusion in an immediately subsequent generation.

Example 67 includes the subject matter of any one of examples 61-66, where the grammatical evolution algorithm generates generations of children neural networks through structural mutation based on one or more of the number of layers, the number of kernels, or size of filters in the neural network.

Example 68 includes the subject matter of any one of examples 61-67, where weights of the neural networks are set through backpropagation.

Example 69 includes the subject matter of any one of examples 61-68, where the grammatical evolution algorithm generates generations of children neural networks through parameter mutation based on one or more of learning rate, batch size, weight decay, momentum, optimizer used, and dropout rate.

Example 70 includes the subject matter of any one of examples 61-69, where the grammatical evolution algorithm applies a Backaus-Naur Form grammar.

Example 71 includes the subject matter of any one of examples 61-70, further including generating the plurality of parent neural networks randomly using combinations of network modules from the set of network modules.

Example 72 includes the subject matter of any one of examples 61-71, where performing the grammatical evolution algorithm includes sorting individual child neural networks into non-dominated fronts.

Example 73 includes the subject matter of any one of examples 61-72, where performing the grammatical evolution algorithm includes a random binary tournament.

Example 74 includes the subject matter of example 73, where winning child neural networks are determined based on a rank value and crowding distance within a group.

Example 75 includes the subject matter of any one of examples 61-74, where the data set includes volumetric data.

Example 76 includes the subject matter of example 75, where the volumetric data is according to a VOLA-based format.

Example 77 includes the subject matter any one of examples 61-76, where the size is measured in a number of parameters of the neural network.

Example 78 is a system including means to perform the method of any one of examples 61-77.

Example 79 includes the subject matter of example 78, where the means include a non-transitory machine-readable storage medium with instructions stored thereon, the instructions executable by a machine to cause the machine to perform at least a portion of the method of any one of examples 61-77.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A non-transitory machine-readable storage medium storing instructions, the instructions executable to:

generate a plurality of child neural network models by developing different neural network components from a plurality of parent neural network models based on an application of the plurality of child neural network models, the plurality of child neural network models comprising the different neural network components, wherein generating the plurality of child neural network models comprises:
  performing multiple evolutions over multiple generations of the plurality of parent neural network models based on a grammar,
  wherein one or more neural network models of a generation are selected for generating a next generation based on an accuracy of the one or more neural network models;
measure sizes of the plurality of child neural network models, a size of a child neural network model corresponding to a number of internal parameters of the child neural network model;
measure accuracies of the plurality of child neural network models;
determine a compute or memory resource available for neural network execution at a machine;
select a child neural network model from the plurality of child neural network models based on the sizes of the plurality of child neural network models, the accuracies of the plurality of child neural network models, and the compute or memory resource available for neural network execution at the machine; and
execute, by the machine using the compute or memory resource, the selected child neural network model for performing a task in the application.

2. The non-transitory machine-readable storage medium of claim 1, wherein the instructions are further executable to perform training of the plurality of child neural network models using training data set, wherein the sizes or accuracies are measured after the training of the plurality of child neural network models.

3. The non-transitory machine-readable storage medium of claim 2, wherein the training data set comprises a first subset of a data set and the accuracies are measured using a second subset of the data set.

4. The non-transitory machine-readable storage medium of claim 1, wherein one or more neural network components of the different neural network components are selected from the plurality of parent neural network models.

5. The non-transitory machine-readable storage medium of claim 4, wherein the plurality of child neural network models is generated further by setting one or more parameter values for the one or more neural network components.

6. The non-transitory machine-readable storage medium of claim 4, wherein the one or more neural network components comprise a convolution network module and an inception network module.

7. The non-transitory machine-readable storage medium of claim 4, wherein the one or more neural network components are connected to one or more fully-connected layers or one or more max-pooling layers.

8. The non-transitory machine-readable storage medium of claim 1, wherein the different neural network components comprise different neural network layers.

9. The non-transitory machine-readable storage medium of claim 1, wherein the plurality of child neural network models is generated further by performing variation operations on parameter values of the plurality of parent neural network models.

10. The non-transitory machine-readable storage medium of claim 9, wherein the variation operations comprise a mutation operation or a crossover operation.

11. The non-transitory machine-readable storage medium of claim 9, wherein the variation operations comprise structural mutation based on a number of layers, number of kernels, or size of a filter in a parent neural network model.

12. The non-transitory machine-readable storage medium of claim 11, wherein the variation operations further comprise a learning parameter mutation of the parent neural network model based on a learning rate, batch size, weight decay, momentum, optimizer used, or dropout rate.

13. The non-transitory machine-readable storage medium of claim 1, wherein the child neural network model is selected based on a result of a random binary tournament.

14. The non-transitory machine-readable storage medium of claim 13, wherein the result of the random binary tournament is based on a rank value and crowding distance within the sizes and accuracies.

15. A method comprising:
generating a plurality of child neural network models by developing different neural network components from a plurality of parent neural network models based on an application of the plurality of child neural network models, the plurality of child neural network models comprising the different neural network components, wherein generating the plurality of child neural network models comprises:
performing multiple evolutions over multiple generations of the plurality of parent neural network models based on a grammar,
wherein one or more neural network models of a generation are selected for generating a next generation based on an accuracy of the one or more neural network models;
measuring sizes of the plurality of child neural network models, a size of a child neural network model corresponding to a number of internal parameters of the child neural network model;
measuring accuracies of the plurality of child neural network models;
determining a compute or memory resource available for neural network execution at a machine; and
selecting a child neural network model from the plurality of child neural network models based on the sizes of the plurality of child neural network models, the accuracies of the plurality of child neural network models, and the compute or memory resource available for neural network execution at the machine,
wherein the selected child neural network model is executed by the machine using the compute or memory resource for performing a task in the application.

16. The method of claim 15, further comprising:
identifying a subset of the plurality of parent neural network models;
generating one or more additional child neural network models from the subset of the plurality of parent neural network models; and
including the one or more additional child neural network models to the plurality of child neural network models.

17. The method of claim 15, wherein developing the different neural network components from the plurality of parent neural network models comprises:
selecting one or more neural network components of the different neural network components from the plurality of parent neural network models; and
setting one or more parameter values for the one or more neural network components based on the application.

18. A system comprising:
at least one data processor; and
at least one memory element storing instructions executable by the data processor to:
generate a plurality of child neural network models by developing different neural network components from a plurality of parent neural network models based on an application of the plurality of child neural network models, the plurality of child neural network models comprising the different neural network components, wherein generating the plurality of child neural network models comprises:
performing multiple evolutions over multiple generations of the plurality of parent neural network models based on a grammar,
wherein one or more neural network models of a generation are selected for generating a next generation based on an accuracy of the one or more neural network models,
measure sizes of the plurality of child neural network models, a size of a child neural network model corresponding to a number of internal parameters of the child neural network model,
measure accuracies of the plurality of child neural network models,
determine a compute or memory resource available for neural network execution at a machine, and
select a child neural network model from the plurality of child neural network models based on the sizes of the plurality of child neural network models, the accuracies of the plurality of child neural network models, and the compute or memory resource available at the machine,
wherein the selected child neural network model is executed by the machine using the compute or memory resource for performing a task in the application.

19. The system of claim 18, wherein one or more neural network components of the different neural network components are selected from the plurality of parent neural network models.

20. The system of claim 18, wherein the plurality of parent neural network models comprises convolutional neural network (CNN) models.

* * * * *